US012311305B2

(12) United States Patent
Esquivel et al.

(10) Patent No.: US 12,311,305 B2
(45) Date of Patent: May 27, 2025

(54) REMOVABLE FLUE GAS STRAINER AND ASSOCIATED METHODS

(71) Applicant: MARATHON PETROLEUM COMPANY LP, Findlay, OH (US)

(72) Inventors: Michael Esquivel, Findlay, OH (US); Ethan Spielvogel, Findlay, OH (US)

(73) Assignee: Marathon Petroleum Company LP, Findlay, OH (US)

( * ) Notice: Subject to any disclaimer, the term of this patent is extended or adjusted under 35 U.S.C. 154(b) by 0 days.

(21) Appl. No.: 18/142,111

(22) Filed: May 2, 2023

(65) Prior Publication Data

US 2024/0189753 A1 Jun. 13, 2024

Related U.S. Application Data

(60) Provisional application No. 63/386,586, filed on Dec. 8, 2022.

(51) Int. Cl.
*B01D 46/16* (2006.01)
*B01D 46/00* (2022.01)
(Continued)

(52) U.S. Cl.
CPC ......... *B01D 46/16* (2013.01); *B01D 46/0005* (2013.01); *B01D 46/62* (2022.01);
(Continued)

(58) Field of Classification Search
None
See application file for complete search history.

(56) References Cited

U.S. PATENT DOCUMENTS

| 981,434 A | 1/1911 | Lander |
| 1,526,301 A | 2/1925 | Stevens |

(Continued)

FOREIGN PATENT DOCUMENTS

| AT | 11772 U1 * | 2/2011 | ............ G01N 21/35 |
| BR | PI0701518 | 11/2008 | |

(Continued)

OTHER PUBLICATIONS

Zhou, Gang et al., Study on the Integration of Flue Gas Waste Heat Desulfurization and Dust Removal in Civilian Coalfired Heating Furnace, 2020 IOP Conf. Ser.: Earth Environ. Sci. 603 Jan. 2018.

(Continued)

*Primary Examiner* — Brit E. Anbacht
(74) *Attorney, Agent, or Firm* — RAY QUINNEY & NEBEKER P.C.; Paul N. Taylor

(57) ABSTRACT

Apparatuses, systems, and methods operable to reduce catalyst fouling by removing solid particulates from a heated fluid stream upstream of a catalyst using one or more flue gas strainer apparatuses that may be cleaned or serviced without ceasing or disrupting heating or catalytic operations. The flue gas strainer apparatuses may include a housing having a front end and a back end, the housing comprising a receiving portion, an outer edge, an inner edge, and an inner bore extending from the front end to the back end of the housing along the inner edge. The inner bore is operable to allow a heated fluid stream to pass therethrough. The flue gas strainer apparatus may also include a moveable strainer portion comprising one or more removable mesh portions. Each of the one or more removable mesh portions may have a plurality of pores and configured to capture solid particulates suspended in the heated fluid stream. The one or more removable mesh portions may be operable to be removingly received in the receiving portion of the housing.

21 Claims, 11 Drawing Sheets

(51) Int. Cl.
*B01D 46/62* (2022.01)
*B01D 46/66* (2022.01)
*B08B 17/02* (2006.01)

(52) U.S. Cl.
CPC .............. *B01D 46/66* (2022.01); *B08B 17/02* (2013.01); *B01D 2265/025* (2013.01); *B01D 2271/027* (2013.01); *B01D 2273/14* (2013.01)

(56) References Cited

U.S. PATENT DOCUMENTS

| | | |
|---|---|---|
| 1,572,922 A | 2/1926 | Govers et al. |
| 1,867,143 A | 7/1932 | Fohl |
| 2,401,570 A | 6/1946 | Koehler |
| 2,498,442 A | 2/1950 | Morey |
| 2,516,097 A | 7/1950 | Woodham et al. |
| 2,686,728 A | 8/1954 | Wallace |
| 2,691,621 A | 10/1954 | Gagle |
| 2,691,773 A | 10/1954 | Lichtenberger |
| 2,731,282 A | 1/1956 | Mcmanus et al. |
| 2,740,616 A | 4/1956 | Walden |
| 2,792,908 A * | 5/1957 | Glanzer ................ B01D 46/88 55/351 |
| 2,804,165 A * | 8/1957 | Blomgren ................ G21F 9/02 976/DIG. 378 |
| 2,867,913 A * | 1/1959 | Faucher ................ F26B 21/06 236/44 R |
| 2,888,239 A | 5/1959 | Slemmons |
| 2,909,482 A | 10/1959 | Williams et al. |
| 2,925,144 A * | 2/1960 | Kroll ..................... B01D 46/12 55/296 |
| 2,963,423 A | 12/1960 | Birchfield |
| 3,063,681 A | 11/1962 | Duguid |
| 3,070,990 A | 1/1963 | Stanley |
| 3,109,481 A | 11/1963 | Yahnke |
| 3,167,305 A | 1/1965 | Backx et al. |
| 3,188,184 A | 6/1965 | Rice et al. |
| 3,199,876 A | 8/1965 | Magos et al. |
| 3,203,460 A | 8/1965 | Kuhne |
| 3,279,441 A | 10/1966 | Lippert et al. |
| 3,307,574 A | 3/1967 | Anderson |
| 3,364,134 A | 1/1968 | Hamblin |
| 3,400,049 A | 9/1968 | Wolfe |
| 3,545,411 A | 12/1970 | Vollradt |
| 3,660,057 A | 5/1972 | Ilnyckyj |
| 3,719,027 A | 3/1973 | Salka |
| 3,720,601 A | 3/1973 | Coonradt |
| 3,771,638 A | 11/1973 | Schneider et al. |
| 3,775,294 A | 11/1973 | Peterson |
| 3,795,607 A | 3/1974 | Adams |
| 3,838,036 A | 9/1974 | Stine et al. |
| 3,839,484 A | 10/1974 | Zimmerman, Jr. |
| 3,840,209 A | 10/1974 | James |
| 3,841,144 A | 10/1974 | Baldwin |
| 3,854,843 A | 12/1974 | Penny |
| 3,874,399 A | 4/1975 | Ishihara |
| 3,901,951 A | 8/1975 | Nishizaki |
| 3,906,780 A | 9/1975 | Baldwin |
| 3,912,307 A | 10/1975 | Totman |
| 3,928,172 A | 12/1975 | Davis et al. |
| 3,937,660 A | 2/1976 | Yates et al. |
| 4,006,075 A | 2/1977 | Luckenbach |
| 4,017,214 A | 4/1977 | Smith |
| 4,066,425 A * | 1/1978 | Nett ....................... B01D 46/90 55/504 |
| 4,085,078 A | 4/1978 | McDonald |
| 4,144,759 A | 3/1979 | Slowik |
| 4,149,756 A | 4/1979 | Tackett |
| 4,151,003 A | 4/1979 | Smith et al. |
| 4,167,492 A | 9/1979 | Varady |
| 4,176,052 A | 11/1979 | Bruce et al. |
| 4,217,116 A * | 8/1980 | Seever .................. B01D 46/90 210/791 |
| 4,260,068 A | 4/1981 | McCarthy et al. |
| 4,299,687 A | 11/1981 | Myers et al. |
| 4,302,324 A | 11/1981 | Chen et al. |
| 4,308,968 A | 1/1982 | Thiltgen et al. |
| 4,312,645 A * | 1/1982 | Mavros ................ B01D 46/10 96/400 |
| 4,328,947 A | 5/1982 | Reimpell et al. |
| 4,332,671 A | 6/1982 | Boyer |
| 4,340,204 A | 7/1982 | Heard |
| 4,353,812 A | 10/1982 | Lomas et al. |
| 4,357,603 A | 11/1982 | Roach et al. |
| 4,392,870 A | 7/1983 | Chieffo et al. |
| 4,404,095 A | 9/1983 | Haddad et al. |
| 4,422,925 A | 12/1983 | Williams et al. |
| 4,434,044 A | 2/1984 | Busch et al. |
| 4,439,533 A | 3/1984 | Lomas et al. |
| 4,468,975 A | 9/1984 | Sayles et al. |
| 4,482,451 A | 11/1984 | Kemp |
| 4,495,063 A | 1/1985 | Walters et al. |
| 4,539,012 A | 9/1985 | Ohzeki et al. |
| 4,554,313 A | 11/1985 | Hagenbach et al. |
| 4,554,799 A | 11/1985 | Pallanch |
| 4,570,942 A | 2/1986 | Diehl et al. |
| 4,583,859 A * | 4/1986 | Hall ....................... B01D 46/46 250/236 |
| 4,601,303 A | 7/1986 | Jensen |
| 4,615,792 A | 10/1986 | Greenwood |
| 4,621,062 A | 11/1986 | Stewart et al. |
| 4,622,210 A | 11/1986 | Hirschberg et al. |
| 4,624,771 A | 11/1986 | Lane et al. |
| 4,647,313 A | 3/1987 | Clementoni |
| 4,654,748 A | 3/1987 | Rees |
| 4,661,241 A | 4/1987 | Dabkowski et al. |
| 4,673,490 A | 6/1987 | Subramanian et al. |
| 4,674,337 A | 6/1987 | Jonas |
| 4,684,759 A | 8/1987 | Lam |
| 4,686,027 A | 8/1987 | Bonilla et al. |
| 4,728,348 A | 3/1988 | Nelson et al. |
| 4,733,888 A | 3/1988 | Toelke |
| 4,741,819 A | 5/1988 | Robinson et al. |
| 4,764,347 A | 8/1988 | Milligan |
| 4,765,631 A | 8/1988 | Kohnen et al. |
| 4,771,176 A | 9/1988 | Scheifer et al. |
| 4,816,137 A | 3/1989 | Swint et al. |
| 4,820,404 A | 4/1989 | Owen |
| 4,824,016 A | 4/1989 | Cody et al. |
| 4,844,133 A | 7/1989 | von Meyerinck et al. |
| 4,844,927 A | 7/1989 | Morris et al. |
| 4,849,182 A | 7/1989 | Luetzelschwab |
| 4,854,855 A | 8/1989 | Rajewski |
| 4,875,994 A | 10/1989 | Haddad et al. |
| 4,877,513 A | 10/1989 | Haire et al. |
| 4,798,463 A | 11/1989 | Koshi |
| 4,901,751 A | 2/1990 | Story et al. |
| 4,914,249 A | 4/1990 | Benedict |
| 4,916,938 A | 4/1990 | Aikin et al. |
| 4,917,790 A | 4/1990 | Owen |
| 4,923,834 A | 5/1990 | Lomas |
| 4,940,900 A | 7/1990 | Lambert |
| 4,957,511 A | 9/1990 | Ljusberg-Wahren |
| 4,960,503 A | 10/1990 | Haun et al. |
| 4,963,745 A | 10/1990 | Maggard |
| 4,972,867 A | 11/1990 | Ruesch |
| 4,980,050 A * | 12/1990 | Huh ...................... C10G 11/05 502/406 |
| 5,000,841 A | 3/1991 | Owen |
| 5,002,459 A | 3/1991 | Swearingen et al. |
| 5,008,653 A | 4/1991 | Kidd et al. |
| 5,009,768 A | 4/1991 | Galiasso et al. |
| 5,013,537 A | 5/1991 | Patarin et al. |
| 5,022,266 A | 6/1991 | Cody et al. |
| 5,032,154 A | 7/1991 | Wright |
| 5,034,115 A | 7/1991 | Avidan |
| 5,045,177 A | 9/1991 | Cooper et al. |
| 5,050,603 A | 9/1991 | Stokes et al. |
| 5,053,371 A | 10/1991 | Williamson |
| 5,056,758 A | 10/1991 | Bramblet |
| 5,059,305 A | 10/1991 | Sapre |
| 5,061,467 A | 10/1991 | Johnson et al. |
| 5,066,049 A | 11/1991 | Staples |
| 5,076,910 A | 12/1991 | Rush |

(56) References Cited

U.S. PATENT DOCUMENTS

| | | |
|---|---|---|
| 5,082,985 A | 1/1992 | Crouzet et al. |
| 5,096,566 A | 3/1992 | Dawson et al. |
| 5,097,677 A | 3/1992 | Holtzapple |
| 5,111,882 A | 5/1992 | Tang et al. |
| 5,112,357 A | 5/1992 | Bjerklund |
| 5,114,562 A | 5/1992 | Haun et al. |
| 5,115,686 A | 5/1992 | Walker et al. |
| 5,120,517 A | 6/1992 | Elshout |
| 5,121,337 A | 6/1992 | Brown |
| 5,128,109 A | 7/1992 | Owen |
| 5,128,292 A | 7/1992 | Lomas |
| 5,129,624 A | 7/1992 | Icenhower et al. |
| 5,138,891 A | 8/1992 | Johnson |
| 5,139,649 A | 8/1992 | Owen et al. |
| 5,145,785 A | 9/1992 | Maggard et al. |
| 5,149,261 A | 9/1992 | Suwa et al. |
| 5,154,558 A | 10/1992 | McCallion |
| 5,160,426 A | 11/1992 | Avidan |
| 5,170,911 A | 12/1992 | Della Riva |
| 5,174,250 A | 12/1992 | Lane |
| 5,174,345 A | 12/1992 | Kesterman et al. |
| 5,178,363 A | 1/1993 | Icenhower et al. |
| 5,196,110 A | 3/1993 | Swart et al. |
| 5,201,850 A | 4/1993 | Lenhardt et al. |
| 5,203,370 A | 4/1993 | Block et al. |
| 5,211,838 A | 5/1993 | Staubs et al. |
| 5,212,129 A | 5/1993 | Lomas |
| 5,221,463 A | 6/1993 | Kamienski et al. |
| 5,223,714 A | 6/1993 | Maggard |
| 5,225,679 A | 7/1993 | Clark et al. |
| 5,230,498 A | 7/1993 | Wood et al. |
| 5,235,999 A | 8/1993 | Lindquist et al. |
| 5,236,765 A | 8/1993 | Cordia et al. |
| 5,243,546 A | 9/1993 | Maggard |
| 5,246,860 A | 9/1993 | Hutchins et al. |
| 5,246,868 A | 9/1993 | Busch et al. |
| 5,248,408 A | 9/1993 | Owen |
| 5,250,807 A | 10/1993 | Sontvedt |
| 5,257,530 A | 11/1993 | Beattie et al. |
| 5,258,115 A | 11/1993 | Heck et al. |
| 5,258,117 A | 11/1993 | Kolstad et al. |
| 5,262,645 A | 11/1993 | Lambert et al. |
| 5,263,682 A | 11/1993 | Covert et al. |
| 5,301,560 A | 4/1994 | Anderson et al. |
| 5,302,294 A | 4/1994 | Schubert |
| 5,316,448 A | 5/1994 | Ziegler et al. |
| 5,320,671 A | 6/1994 | Schilling |
| 5,326,074 A | 7/1994 | Spock et al. |
| 5,328,505 A | 7/1994 | Schilling |
| 5,328,591 A | 7/1994 | Raterman |
| 5,332,492 A | 7/1994 | Maurer et al. |
| 5,338,439 A | 8/1994 | Owen et al. |
| 5,348,645 A | 9/1994 | Maggard et al. |
| 5,349,188 A | 9/1994 | Maggard |
| 5,349,189 A | 9/1994 | Maggard |
| 5,354,451 A | 10/1994 | Goldstein et al. |
| 5,354,453 A | 10/1994 | Bhatia |
| 5,361,643 A | 11/1994 | Boyd et al. |
| 5,362,965 A | 11/1994 | Maggard |
| 5,370,146 A | 12/1994 | King et al. |
| 5,370,790 A | 12/1994 | Maggard et al. |
| 5,372,270 A | 12/1994 | Rosenkrantz |
| 5,372,352 A | 12/1994 | Smith et al. |
| 5,381,002 A | 1/1995 | Morrow et al. |
| 5,388,805 A | 2/1995 | Bathrick et al. |
| 5,389,232 A | 2/1995 | Adewuyi et al. |
| 5,404,015 A | 4/1995 | Chimenti et al. |
| 5,415,025 A | 5/1995 | Bartman et al. |
| 5,416,323 A | 5/1995 | Hoots et al. |
| 5,417,843 A | 5/1995 | Swart et al. |
| 5,417,846 A | 5/1995 | Renard |
| 5,423,446 A | 6/1995 | Johnson |
| 5,431,067 A | 7/1995 | Anderson et al. |
| 5,433,120 A | 7/1995 | Boyd et al. |
| 5,435,436 A | 7/1995 | Manley et al. |
| 5,443,716 A | 8/1995 | Anderson et al. |
| 5,446,681 A | 8/1995 | Gethner et al. |
| 5,452,232 A | 9/1995 | Espinosa et al. |
| RE35,046 E | 10/1995 | Hettinger et al. |
| 5,459,677 A | 10/1995 | Kowalski et al. |
| 5,472,875 A | 12/1995 | Monticello |
| 5,474,607 A | 12/1995 | Holleran |
| 5,475,612 A | 12/1995 | Espinosa et al. |
| 5,476,117 A | 12/1995 | Pakula |
| 5,490,085 A | 2/1996 | Lambert et al. |
| 5,492,617 A | 2/1996 | Trimble et al. |
| 5,494,079 A | 2/1996 | Tiedemann |
| 5,507,326 A | 4/1996 | Cadman et al. |
| 5,510,265 A | 4/1996 | Monticello |
| 5,516,969 A | 5/1996 | Krasznai et al. |
| 5,532,487 A | 7/1996 | Brearley et al. |
| 5,540,893 A | 7/1996 | English |
| 5,549,814 A | 8/1996 | Zinke |
| 5,556,222 A | 9/1996 | Chen |
| 5,559,295 A | 9/1996 | Sheryll |
| 5,560,509 A | 10/1996 | Laverman et al. |
| 5,569,808 A | 10/1996 | Cansell et al. |
| 5,573,032 A | 11/1996 | Lenz et al. |
| 5,584,985 A | 12/1996 | Lomas |
| 5,596,196 A | 1/1997 | Cooper et al. |
| 5,600,134 A | 2/1997 | Ashe et al. |
| 5,647,961 A | 7/1997 | Lofland |
| 5,652,145 A | 7/1997 | Cody et al. |
| 5,675,071 A | 10/1997 | Cody et al. |
| 5,681,749 A | 10/1997 | Ramamoorthy |
| 5,684,580 A | 11/1997 | Cooper et al. |
| 5,699,269 A | 12/1997 | Ashe et al. |
| 5,699,270 A | 12/1997 | Ashe et al. |
| 5,712,481 A | 1/1998 | Welch et al. |
| 5,712,797 A | 1/1998 | Descales et al. |
| 5,713,401 A | 2/1998 | Weeks |
| 5,716,055 A | 2/1998 | Wilkinson et al. |
| 5,717,209 A | 2/1998 | Bigman et al. |
| 5,740,073 A | 4/1998 | Bages et al. |
| 5,744,024 A | 4/1998 | Sullivan, III et al. |
| 5,744,702 A | 4/1998 | Roussis et al. |
| 5,746,906 A | 5/1998 | McHenry et al. |
| 5,751,415 A | 5/1998 | Smith et al. |
| 5,758,514 A | 6/1998 | Genung et al. |
| 5,763,883 A | 6/1998 | Descales et al. |
| 5,800,697 A | 9/1998 | Lengemann |
| 5,817,517 A | 10/1998 | Perry et al. |
| 5,822,058 A | 10/1998 | Adler-Golden et al. |
| 5,834,539 A | 11/1998 | Krivohlavek |
| 5,837,130 A | 11/1998 | Crossland |
| 5,853,455 A | 12/1998 | Gibson |
| 5,856,869 A | 1/1999 | Cooper et al. |
| 5,858,207 A | 1/1999 | Lomas |
| 5,858,210 A | 1/1999 | Richardson |
| 5,858,212 A | 1/1999 | Darcy |
| 5,861,228 A | 1/1999 | Descales et al. |
| 5,862,060 A | 1/1999 | Murray, Jr. |
| 5,865,441 A | 2/1999 | Orlowski |
| 5,883,363 A | 3/1999 | Motoyoshi et al. |
| 5,885,439 A | 3/1999 | Glover |
| 5,892,228 A | 4/1999 | Cooper et al. |
| 5,895,506 A | 4/1999 | Cook et al. |
| 5,916,433 A | 6/1999 | Tejada et al. |
| 5,919,354 A | 7/1999 | Bartek |
| 5,935,415 A | 8/1999 | Haizmann et al. |
| 5,940,176 A | 8/1999 | Knapp |
| 5,972,171 A | 10/1999 | Ross et al. |
| 5,979,491 A | 11/1999 | Gonsior |
| 5,997,723 A | 12/1999 | Wiehe et al. |
| 6,015,440 A | 1/2000 | Noureddini |
| 6,025,305 A | 2/2000 | Aldrich et al. |
| 6,026,841 A | 2/2000 | Kozik |
| 6,040,186 A | 3/2000 | Lewis |
| 6,047,602 A | 4/2000 | Lynnworth |
| 6,056,005 A | 5/2000 | Piotrowski et al. |
| 6,062,274 A | 5/2000 | Pettesch |
| 6,063,263 A | 5/2000 | Palmas |
| 6,063,265 A | 5/2000 | Chiyoda et al. |
| 6,070,128 A | 5/2000 | Descales et al. |

(56) References Cited

U.S. PATENT DOCUMENTS

| | | |
|---|---|---|
| 6,072,576 A | 6/2000 | McDonald et al. |
| 6,076,864 A | 6/2000 | Levivier et al. |
| 6,087,662 A | 7/2000 | Wilt et al. |
| 6,093,867 A | 7/2000 | Ladwig et al. |
| 6,099,607 A | 8/2000 | Haslebacher |
| 6,099,616 A | 8/2000 | Jenne et al. |
| 6,100,975 A | 8/2000 | Smith et al. |
| 6,102,655 A | 8/2000 | Kreitmeier |
| 6,105,441 A | 8/2000 | Conner et al. |
| 6,107,631 A | 8/2000 | He |
| 6,117,812 A | 9/2000 | Gao et al. |
| 6,130,095 A | 10/2000 | Shearer |
| 6,140,647 A | 10/2000 | Welch et al. |
| 6,153,091 A | 11/2000 | Sechrist et al. |
| 6,155,294 A | 12/2000 | Cornford et al. |
| 6,162,644 A | 12/2000 | Choi et al. |
| 6,165,350 A | 12/2000 | Lokhandwala et al. |
| 6,169,218 B1 | 1/2001 | Hearn |
| 6,171,052 B1 | 1/2001 | Aschenbruck et al. |
| 6,174,501 B1 | 1/2001 | Noureddini |
| 6,190,535 B1 | 2/2001 | Kalnes et al. |
| 6,203,585 B1 | 3/2001 | Majerczak |
| 6,235,104 B1 | 5/2001 | Chattopadhyay et al. |
| 6,258,987 B1 | 7/2001 | Schmidt et al. |
| 6,271,518 B1 | 8/2001 | Boehm et al. |
| 6,274,785 B1 | 8/2001 | Gore |
| 6,284,128 B1 | 9/2001 | Glover et al. |
| 6,296,812 B1 | 10/2001 | Gauthier et al. |
| 6,312,586 B1 | 11/2001 | Kalnes et al. |
| 6,315,815 B1 | 11/2001 | Spadaccini |
| 6,324,895 B1 | 12/2001 | Chitnis et al. |
| 6,328,348 B1 | 12/2001 | Cornford et al. |
| 6,331,436 B1 | 12/2001 | Richardson et al. |
| 6,348,074 B2 | 2/2002 | Wenzel |
| 6,350,371 B1 | 2/2002 | Lokhandwala et al. |
| 6,368,495 B1 | 4/2002 | Kocal et al. |
| 6,382,633 B1 | 5/2002 | Hashiguchi et al. |
| 6,390,673 B1 | 5/2002 | Camburn |
| 6,395,228 B1 | 5/2002 | Maggard et al. |
| 6,398,518 B1 | 6/2002 | Ingistov |
| 6,399,800 B1 | 6/2002 | Haas et al. |
| 6,420,181 B1 | 7/2002 | Novak |
| 6,422,035 B1 | 7/2002 | Phillippe |
| 6,435,279 B1 | 8/2002 | Howe et al. |
| 6,446,446 B1 | 9/2002 | Cowans |
| 6,446,729 B1 | 9/2002 | Bixenman et al. |
| 6,451,197 B1 | 9/2002 | Kalnes |
| 6,454,935 B1 | 9/2002 | Lesieur et al. |
| 6,467,303 B2 | 10/2002 | Ross |
| 6,482,762 B1 | 11/2002 | Ruffin et al. |
| 6,503,460 B1 | 1/2003 | Miller et al. |
| 6,528,047 B2 | 3/2003 | Arif et al. |
| 6,540,797 B1 | 4/2003 | Scott et al. |
| 6,558,531 B2 | 5/2003 | Steffens et al. |
| 6,589,323 B1 | 7/2003 | Korin |
| 6,592,448 B1 * | 7/2003 | Williams ............... G06F 1/20 361/695 |
| 6,609,888 B1 | 8/2003 | Ingistov |
| 6,622,490 B2 | 9/2003 | Ingistov |
| 6,644,935 B2 | 11/2003 | Ingistov |
| 6,660,895 B1 | 12/2003 | Brunet et al. |
| 6,672,858 B1 | 1/2004 | Benson et al. |
| 6,733,232 B2 | 5/2004 | Ingistov |
| 6,733,237 B2 | 5/2004 | Ingistov |
| 6,736,961 B2 | 5/2004 | Plummer et al. |
| 6,740,226 B2 | 5/2004 | Mehra et al. |
| 6,772,581 B2 | 8/2004 | Ojiro et al. |
| 6,772,741 B1 | 8/2004 | Pittel et al. |
| 6,814,941 B1 | 11/2004 | Naunheimer et al. |
| 6,824,673 B1 | 11/2004 | Ellis et al. |
| 6,827,841 B2 | 12/2004 | Kiser et al. |
| 6,835,223 B2 | 12/2004 | Walker et al. |
| 6,841,133 B2 | 1/2005 | Niewiedzial et al. |
| 6,842,702 B2 | 1/2005 | Haaland et al. |
| 6,854,346 B2 | 2/2005 | Nimberger |
| 6,858,128 B1 | 2/2005 | Hoehn et al. |
| 6,866,771 B2 | 3/2005 | Lomas et al. |
| 6,869,521 B2 | 3/2005 | Lomas |
| 6,897,071 B2 | 5/2005 | Sonbul |
| 6,962,484 B2 | 11/2005 | Brandl et al. |
| 7,013,718 B2 | 3/2006 | Ingistov et al. |
| 7,035,767 B2 | 4/2006 | Archer et al. |
| 7,048,254 B2 | 5/2006 | Laurent et al. |
| 7,074,321 B1 | 7/2006 | Kalnes |
| 7,078,005 B2 | 7/2006 | Smith et al. |
| 7,087,153 B1 | 8/2006 | Kalnes |
| 7,156,123 B2 | 1/2007 | Welker et al. |
| 7,172,686 B1 | 2/2007 | Ji et al. |
| 7,174,715 B2 | 2/2007 | Armitage et al. |
| 7,194,369 B2 | 3/2007 | Lundstedt et al. |
| 7,213,413 B2 | 5/2007 | Battiste et al. |
| 7,225,840 B1 | 6/2007 | Craig et al. |
| 7,228,250 B2 | 6/2007 | Naiman et al. |
| 7,244,350 B2 | 7/2007 | Kar et al. |
| 7,252,755 B2 | 8/2007 | Kiser et al. |
| 7,255,531 B2 | 8/2007 | Ingistov |
| 7,260,499 B2 | 8/2007 | Watzke et al. |
| 7,291,257 B2 | 11/2007 | Ackerson et al. |
| 7,332,132 B2 | 2/2008 | Hedrick et al. |
| 7,404,411 B2 | 7/2008 | Welch et al. |
| 7,419,583 B2 | 9/2008 | Nieskens et al. |
| 7,445,936 B2 | 11/2008 | O'Connor et al. |
| 7,459,081 B2 | 12/2008 | Koenig |
| 7,485,801 B1 | 2/2009 | Pulter et al. |
| 7,487,955 B1 | 2/2009 | Buercklin |
| 7,501,285 B1 | 3/2009 | Triche et al. |
| 7,551,420 B2 | 6/2009 | Cerqueira et al. |
| 7,571,765 B2 | 8/2009 | Themig |
| 7,637,970 B1 | 12/2009 | Fox et al. |
| 7,669,653 B2 | 3/2010 | Craster et al. |
| 7,682,501 B2 | 3/2010 | Soni et al. |
| 7,686,280 B2 | 3/2010 | Lowery |
| 7,857,964 B2 | 12/2010 | Mashiko et al. |
| 7,866,346 B1 | 1/2011 | Walters |
| 7,895,011 B2 | 2/2011 | Youssefi et al. |
| 7,914,601 B2 | 3/2011 | Farr et al. |
| 7,931,803 B2 * | 4/2011 | Buchanan ............... B01D 46/70 210/411 |
| 7,932,424 B2 | 4/2011 | Fujimoto et al. |
| 7,939,335 B1 | 5/2011 | Triche et al. |
| 7,981,361 B2 * | 7/2011 | Bacik .................... B01D 46/10 134/111 |
| 7,988,753 B1 | 8/2011 | Fox et al. |
| 7,993,514 B2 | 8/2011 | Schlueter |
| 8,007,662 B2 | 8/2011 | Lomas et al. |
| 8,017,910 B2 | 9/2011 | Sharpe |
| 8,029,662 B2 | 10/2011 | Varma et al. |
| 8,037,938 B2 | 10/2011 | Jardim De Azevedo et al. |
| 8,038,774 B2 | 10/2011 | Peng |
| 8,064,052 B2 | 11/2011 | Feitisch et al. |
| 8,066,867 B2 | 11/2011 | Dziabala |
| 8,080,426 B1 | 12/2011 | Moore et al. |
| 8,127,845 B2 | 3/2012 | Assal |
| 8,193,401 B2 | 6/2012 | McGehee et al. |
| 8,236,566 B2 | 8/2012 | Carpenter et al. |
| 8,286,673 B1 | 10/2012 | Recker et al. |
| 8,354,065 B1 | 1/2013 | Sexton |
| 8,360,118 B2 | 1/2013 | Fleischer et al. |
| 8,370,082 B2 | 2/2013 | De Peinder et al. |
| 8,388,830 B2 | 3/2013 | Sohn et al. |
| 8,389,285 B2 | 3/2013 | Carpenter et al. |
| 8,397,803 B2 | 3/2013 | Crabb et al. |
| 8,397,820 B2 | 3/2013 | Fehr et al. |
| 8,404,103 B2 | 3/2013 | Dziabala |
| 8,434,800 B1 | 5/2013 | LeBlanc |
| 8,481,942 B2 | 7/2013 | Mertens |
| 8,506,656 B1 | 8/2013 | Turocy |
| 8,518,131 B2 | 8/2013 | Mattingly et al. |
| 8,524,180 B2 | 9/2013 | Canari et al. |
| 8,569,068 B2 | 10/2013 | Carpenter et al. |
| 8,579,139 B1 | 11/2013 | Sablak |
| 8,591,814 B2 | 11/2013 | Hodges |
| 8,609,048 B1 | 12/2013 | Beadle |
| 8,647,415 B1 | 2/2014 | De Haan et al. |

(56) References Cited

U.S. PATENT DOCUMENTS

| | | |
|---|---|---|
| 8,670,945 B2 | 3/2014 | van Schie |
| 8,685,232 B2 | 4/2014 | Mandal et al. |
| 8,735,820 B2 | 5/2014 | Mertens |
| 8,753,502 B1 | 6/2014 | Sexton et al. |
| 8,764,970 B1 | 7/2014 | Moore et al. |
| 8,778,823 B1 | 7/2014 | Oyekan et al. |
| 8,781,757 B2 | 7/2014 | Farquharson et al. |
| 8,784,645 B2 | 7/2014 | Iguchi et al. |
| 8,829,258 B2 | 9/2014 | Gong et al. |
| 8,916,041 B2 | 12/2014 | Van Den Berg et al. |
| 8,932,458 B1 | 1/2015 | Gianzon et al. |
| 8,986,402 B2 | 3/2015 | Kelly |
| 8,987,537 B1 | 3/2015 | Droubi et al. |
| 8,999,011 B2 | 4/2015 | Stern et al. |
| 8,999,012 B2 | 4/2015 | Kelly et al. |
| 9,011,674 B2 | 4/2015 | Milam et al. |
| 9,057,035 B1 | 6/2015 | Kraus et al. |
| 9,097,423 B2 | 8/2015 | Kraus et al. |
| 9,109,176 B2 | 8/2015 | Stern et al. |
| 9,109,177 B2 | 8/2015 | Freel et al. |
| 9,138,738 B1 | 9/2015 | Glover et al. |
| 9,216,376 B2 | 12/2015 | Liu et al. |
| 9,272,241 B2 | 3/2016 | Königsson |
| 9,273,867 B2 | 3/2016 | Buzinski et al. |
| 9,279,748 B1 | 3/2016 | Hughes et al. |
| 9,289,715 B2 | 3/2016 | Høy-Petersen et al. |
| 9,315,403 B1 | 4/2016 | Laur et al. |
| 9,371,493 B1 | 6/2016 | Oyekan |
| 9,371,494 B2 | 6/2016 | Oyekan et al. |
| 9,377,340 B2 | 6/2016 | Hägg |
| 9,393,520 B2 | 7/2016 | Gomez |
| 9,410,102 B2 | 8/2016 | Eaton et al. |
| 9,428,695 B2 | 8/2016 | Narayanaswamy et al. |
| 9,453,169 B2 | 9/2016 | Stippich, Jr. et al. |
| 9,458,396 B2 | 10/2016 | Weiss et al. |
| 9,487,718 B2 | 11/2016 | Kraus et al. |
| 9,499,758 B2 | 11/2016 | Droubi et al. |
| 9,500,300 B2 | 11/2016 | Daigle |
| 9,506,649 B2 | 11/2016 | Rennie et al. |
| 9,580,662 B1 | 2/2017 | Moore |
| 9,624,448 B2 | 4/2017 | Joo et al. |
| 9,650,580 B2 | 5/2017 | Merdrignac et al. |
| 9,657,241 B2 | 5/2017 | Craig et al. |
| 9,662,597 B1 | 5/2017 | Formoso |
| 9,663,729 B2 | 5/2017 | Baird et al. |
| 9,665,693 B2 | 5/2017 | Saeger et al. |
| 9,709,545 B2 | 7/2017 | Mertens |
| 9,757,686 B2 | 9/2017 | Peng |
| 9,789,290 B2 * | 10/2017 | Forsell ............... A61M 27/002 |
| 9,803,152 B2 | 10/2017 | Kar et al. |
| 9,834,731 B2 | 12/2017 | Weiss et al. |
| 9,840,674 B2 | 12/2017 | Weiss et al. |
| 9,873,080 B2 | 1/2018 | Richardson |
| 9,878,300 B2 | 1/2018 | Norling |
| 9,890,907 B1 | 2/2018 | Highfield et al. |
| 9,891,198 B2 | 2/2018 | Sutan |
| 9,895,649 B2 | 2/2018 | Brown et al. |
| 9,896,630 B2 | 2/2018 | Weiss et al. |
| 9,914,094 B2 | 3/2018 | Jenkins et al. |
| 9,920,270 B2 | 3/2018 | Robinson et al. |
| 9,925,486 B1 * | 3/2018 | Botti ............... B01D 46/0005 |
| 9,982,788 B1 | 5/2018 | Maron |
| 9,988,585 B2 | 6/2018 | Hayasaka et al. |
| 10,047,299 B2 | 8/2018 | Rubin-Pitel et al. |
| 10,048,100 B1 | 8/2018 | Workman, Jr. |
| 10,087,397 B2 | 10/2018 | Phillips et al. |
| 10,099,175 B2 | 10/2018 | Takashashi et al. |
| 10,150,078 B2 | 12/2018 | Komatsu et al. |
| 10,228,708 B2 | 3/2019 | Lambert et al. |
| 10,239,034 B1 | 3/2019 | Sexton |
| 10,253,269 B2 | 4/2019 | Cantley et al. |
| 10,266,779 B2 | 4/2019 | Weiss et al. |
| 10,295,521 B2 | 5/2019 | Mertens |
| 10,308,884 B2 | 6/2019 | Klussman |
| 10,316,263 B2 | 6/2019 | Rubin-Pitel et al. |
| 10,384,157 B2 * | 8/2019 | Balcik ............... B01D 46/71 |
| 10,435,339 B2 | 10/2019 | Larsen et al. |
| 10,435,636 B2 | 10/2019 | Johnson et al. |
| 10,443,000 B2 | 10/2019 | Lomas |
| 10,443,006 B1 | 10/2019 | Fruchey et al. |
| 10,457,881 B2 | 10/2019 | Droubi et al. |
| 10,479,943 B2 | 11/2019 | Liu et al. |
| 10,494,579 B2 | 12/2019 | Wrigley et al. |
| 10,495,570 B2 | 12/2019 | Owen et al. |
| 10,501,699 B2 | 12/2019 | Robinson et al. |
| 10,526,547 B2 | 1/2020 | Larsen et al. |
| 10,533,141 B2 | 1/2020 | Moore et al. |
| 10,563,130 B2 | 2/2020 | Narayanaswamy et al. |
| 10,563,132 B2 | 2/2020 | Moore et al. |
| 10,563,133 B2 | 2/2020 | Moore et al. |
| 10,570,078 B2 | 2/2020 | Larsen et al. |
| 10,577,551 B2 | 3/2020 | Kraus et al. |
| 10,584,287 B2 | 3/2020 | Klussman et al. |
| 10,604,709 B2 | 3/2020 | Moore et al. |
| 10,640,719 B2 | 5/2020 | Freel et al. |
| 10,655,074 B2 | 5/2020 | Moore et al. |
| 10,696,906 B2 | 6/2020 | Cantley et al. |
| 10,808,184 B1 | 10/2020 | Moore |
| 10,836,966 B2 | 11/2020 | Moore et al. |
| 10,876,053 B2 | 12/2020 | Klussman et al. |
| 10,954,456 B2 | 3/2021 | Moore et al. |
| 10,961,468 B2 | 3/2021 | Moore et al. |
| 10,962,259 B2 | 3/2021 | Shah et al. |
| 10,968,403 B2 | 4/2021 | Moore |
| 11,021,662 B2 | 6/2021 | Moore et al. |
| 11,098,255 B2 | 8/2021 | Larsen et al. |
| 11,124,714 B2 | 9/2021 | Eller et al. |
| 11,136,513 B2 | 10/2021 | Moore et al. |
| 11,164,406 B2 | 11/2021 | Meroux et al. |
| 11,168,270 B1 | 11/2021 | Moore |
| 11,175,039 B2 | 11/2021 | Lochschmied et al. |
| 11,203,719 B2 | 12/2021 | Cantley et al. |
| 11,203,722 B2 | 12/2021 | Moore et al. |
| 11,214,741 B2 | 1/2022 | Davdov et al. |
| 11,306,253 B2 | 4/2022 | Timken et al. |
| 11,319,262 B2 | 5/2022 | Wu et al. |
| 11,352,577 B2 | 6/2022 | Woodchick et al. |
| 11,352,578 B2 | 6/2022 | Eller et al. |
| 11,384,301 B2 | 7/2022 | Eller et al. |
| 11,421,162 B2 | 8/2022 | Pradeep et al. |
| 11,460,478 B2 | 10/2022 | Sugiyama et al. |
| 11,467,172 B1 | 10/2022 | Mitzel et al. |
| 11,542,441 B2 | 1/2023 | Larsen et al. |
| 11,578,638 B2 | 2/2023 | Thobe |
| 11,634,647 B2 | 4/2023 | Cantley et al. |
| 11,667,858 B2 | 6/2023 | Eller et al. |
| 11,692,141 B2 | 7/2023 | Larsen et al. |
| 11,702,600 B2 | 7/2023 | Sexton et al. |
| 11,715,950 B2 | 8/2023 | Miller et al. |
| 11,720,526 B2 | 8/2023 | Miller et al. |
| 11,802,257 B2 | 10/2023 | Short et al. |
| 11,835,450 B2 | 12/2023 | Bledsoe, Jr. et al. |
| 11,860,069 B2 | 1/2024 | Bledsoe, Jr. |
| 11,891,581 B2 | 2/2024 | Cantley et al. |
| 11,898,109 B2 | 2/2024 | Sexton et al. |
| 11,905,468 B2 | 2/2024 | Sexton et al. |
| 11,905,479 B2 | 2/2024 | Eller et al. |
| 11,906,423 B2 | 2/2024 | Bledsoe, Jr. |
| 11,920,096 B2 | 3/2024 | Woodchick et al. |
| 11,921,035 B2 | 3/2024 | Bledsoe, Jr. et al. |
| 11,970,664 B2 | 4/2024 | Larsen |
| 11,975,316 B2 | 5/2024 | Zalewski |
| 12,000,720 B2 | 6/2024 | Langlois, III |
| 12,018,216 B2 | 6/2024 | Larsen et al. |
| 12,031,094 B2 | 7/2024 | Sexton et al. |
| 12,031,676 B2 | 7/2024 | Craig et al. |
| 12,037,548 B2 | 7/2024 | Larsen et al. |
| 12,163,878 B2 | 12/2024 | Bledsoe, Jr. |
| 2002/0014068 A1 | 2/2002 | Mittricker et al. |
| 2002/0061633 A1 | 5/2002 | Marsh |
| 2002/0170431 A1 | 11/2002 | Chang et al. |
| 2003/0041518 A1 | 3/2003 | Wallace et al. |
| 2003/0113598 A1 | 6/2003 | Chow et al. |
| 2003/0188536 A1 | 10/2003 | Mittricker |

(56) References Cited

U.S. PATENT DOCUMENTS

| | | |
|---|---|---|
| 2003/0194322 A1 | 10/2003 | Brandl et al. |
| 2004/0010170 A1 | 1/2004 | Vickers |
| 2004/0033617 A1 | 2/2004 | Sonbul |
| 2004/0040201 A1 | 3/2004 | Roos et al. |
| 2004/0079431 A1 | 4/2004 | Kissell |
| 2004/0121472 A1 | 6/2004 | Nemana et al. |
| 2004/0129605 A1 | 7/2004 | Goldstein et al. |
| 2004/0139858 A1* | 7/2004 | Entezarian ............ B01D 46/30 95/275 |
| 2004/0154610 A1 | 8/2004 | Hopp et al. |
| 2004/0232050 A1 | 11/2004 | Martin et al. |
| 2004/0251170 A1 | 12/2004 | Chiyoda et al. |
| 2005/0042151 A1 | 2/2005 | Alward et al. |
| 2005/0088653 A1 | 4/2005 | Coates et al. |
| 2005/0123466 A1 | 6/2005 | Sullivan |
| 2005/0139516 A1 | 6/2005 | Nieskens et al. |
| 2005/0143609 A1 | 6/2005 | Wolf et al. |
| 2005/0150820 A1 | 7/2005 | Guo |
| 2005/0216214 A1 | 9/2005 | Gorin |
| 2005/0229777 A1* | 10/2005 | Brown ................... B01D 46/44 96/417 |
| 2006/0037237 A1 | 2/2006 | Copeland et al. |
| 2006/0042701 A1 | 3/2006 | Jansen |
| 2006/0049082 A1 | 3/2006 | Niccum et al. |
| 2006/0091059 A1 | 5/2006 | Barbaro |
| 2006/0162243 A1 | 7/2006 | Wolf |
| 2006/0169305 A1 | 8/2006 | Jansen et al. |
| 2006/0210456 A1 | 9/2006 | Bruggendick |
| 2006/0169064 A1 | 10/2006 | Anschutz et al. |
| 2006/0220383 A1 | 10/2006 | Erickson |
| 2007/0003450 A1 | 1/2007 | Burdett et al. |
| 2007/0082407 A1 | 4/2007 | Little, III |
| 2007/0112258 A1 | 5/2007 | Soyemi et al. |
| 2007/0202027 A1 | 8/2007 | Walker et al. |
| 2007/0212271 A1 | 9/2007 | Kennedy et al. |
| 2007/0212790 A1 | 9/2007 | Welch et al. |
| 2007/0215521 A1 | 9/2007 | Havlik et al. |
| 2007/0243556 A1 | 10/2007 | Wachs |
| 2007/0283812 A1 | 12/2007 | Liu et al. |
| 2008/0078693 A1 | 4/2008 | Sexton et al. |
| 2008/0078694 A1 | 4/2008 | Sexton et al. |
| 2008/0078695 A1 | 4/2008 | Sexton et al. |
| 2008/0081844 A1 | 4/2008 | Shires et al. |
| 2008/0087592 A1* | 4/2008 | Buchanan ............ B01D 29/70 210/407 |
| 2008/0092436 A1 | 4/2008 | Seames et al. |
| 2008/0109107 A1 | 5/2008 | Stefani et al. |
| 2008/0149486 A1 | 6/2008 | Greaney et al. |
| 2008/0156696 A1 | 7/2008 | Niccum et al. |
| 2008/0207974 A1 | 8/2008 | McCoy et al. |
| 2008/0211505 A1 | 9/2008 | Trygstad et al. |
| 2008/0247942 A1 | 10/2008 | Kandziora et al. |
| 2008/0253936 A1 | 10/2008 | Abhari |
| 2009/0151250 A1 | 6/2009 | Agrawal |
| 2009/0152454 A1 | 6/2009 | Nelson et al. |
| 2009/0158824 A1 | 6/2009 | Brown et al. |
| 2010/0127217 A1 | 5/2010 | Lightowlers et al. |
| 2010/0131247 A1 | 5/2010 | Carpenter et al. |
| 2010/0166602 A1* | 7/2010 | Bacik ................... B01D 46/10 422/292 |
| 2010/0243235 A1 | 9/2010 | Caldwell et al. |
| 2010/0301044 A1 | 12/2010 | Sprecher |
| 2010/0318118 A1* | 12/2010 | Forsell ................. A61F 2/0036 606/201 |
| 2011/0147267 A1 | 6/2011 | Kaul et al. |
| 2011/0155646 A1 | 6/2011 | Karas et al. |
| 2011/0175032 A1 | 7/2011 | Günther |
| 2011/0186307 A1 | 8/2011 | Derby |
| 2011/0220586 A1* | 9/2011 | Levitt ................. B01D 29/906 210/791 |
| 2011/0237856 A1 | 9/2011 | Mak |
| 2011/0247835 A1 | 10/2011 | Crabb |
| 2011/0277377 A1 | 11/2011 | Novak et al. |
| 2011/0299076 A1 | 12/2011 | Feitisch et al. |
| 2011/0319698 A1 | 12/2011 | Sohn et al. |
| 2012/0012342 A1 | 1/2012 | Wilkin et al. |
| 2012/0125813 A1 | 5/2012 | Bridges et al. |
| 2012/0125814 A1 | 5/2012 | Sanchez et al. |
| 2012/0131853 A1 | 5/2012 | Thacker et al. |
| 2012/0222550 A1 | 9/2012 | Ellis |
| 2012/0272715 A1 | 11/2012 | Kriel et al. |
| 2013/0014431 A1 | 1/2013 | Jin et al. |
| 2013/0034477 A1* | 2/2013 | Heidenreich ........ B01D 53/869 422/600 |
| 2013/0109895 A1 | 5/2013 | Novak et al. |
| 2013/0112313 A1 | 5/2013 | Donnelly et al. |
| 2013/0125619 A1 | 5/2013 | Wang |
| 2013/0152525 A1* | 6/2013 | Brandner .................. B04C 3/06 137/15.01 |
| 2013/0186739 A1 | 7/2013 | Trompiz |
| 2013/0192339 A1 | 8/2013 | Kriel et al. |
| 2013/0225897 A1 | 8/2013 | Candelon et al. |
| 2013/0288355 A1 | 10/2013 | DeWitte et al. |
| 2013/0302738 A1 | 11/2013 | Rennie |
| 2013/0334027 A1 | 12/2013 | Winter et al. |
| 2013/0342203 A1 | 12/2013 | Trygstad et al. |
| 2014/0019052 A1 | 1/2014 | Zaeper et al. |
| 2014/0024873 A1 | 1/2014 | De Haan et al. |
| 2014/0030174 A1* | 1/2014 | Leininger ................ C10K 1/32 422/612 |
| 2014/0041150 A1* | 2/2014 | Sjoberg ................... A47L 9/125 15/352 |
| 2014/0121428 A1 | 5/2014 | Wang et al. |
| 2014/0229010 A1 | 8/2014 | Farquharson et al. |
| 2014/0251129 A1* | 9/2014 | Upadhyay ............ B01D 46/12 96/400 |
| 2014/0296057 A1 | 10/2014 | Ho et al. |
| 2014/0299515 A1 | 10/2014 | Weiss et al. |
| 2014/0311953 A1 | 10/2014 | Chimenti et al. |
| 2014/0316176 A1 | 10/2014 | Fjare et al. |
| 2014/0332444 A1 | 11/2014 | Weiss et al. |
| 2014/0353138 A1 | 12/2014 | Amale et al. |
| 2014/0374322 A1 | 12/2014 | Venkatesh |
| 2015/0005547 A1 | 1/2015 | Freel et al. |
| 2015/0005548 A1 | 1/2015 | Freel et al. |
| 2015/0007720 A1* | 1/2015 | Vu ........................ B01D 46/76 95/20 |
| 2015/0034570 A1 | 2/2015 | Andreussi |
| 2015/0034599 A1 | 2/2015 | Hunger et al. |
| 2015/0057477 A1 | 2/2015 | Ellig et al. |
| 2015/0071028 A1 | 3/2015 | Glanville |
| 2015/0122704 A1 | 5/2015 | Kumar et al. |
| 2015/0166426 A1 | 6/2015 | Wegerer et al. |
| 2015/0240167 A1 | 8/2015 | Kulprathipanja et al. |
| 2015/0240174 A1 | 8/2015 | Bru et al. |
| 2015/0337207 A1 | 11/2015 | Chen et al. |
| 2015/0337225 A1 | 11/2015 | Droubi et al. |
| 2015/0337226 A1 | 11/2015 | Tardif et al. |
| 2015/0353851 A1 | 12/2015 | Buchanan |
| 2016/0045918 A1 | 2/2016 | Lapham |
| 2016/0090539 A1 | 3/2016 | Frey et al. |
| 2016/0122662 A1 | 5/2016 | Weiss et al. |
| 2016/0122666 A1 | 5/2016 | Weiss et al. |
| 2016/0160139 A1 | 6/2016 | Dawe et al. |
| 2016/0168481 A1 | 6/2016 | Ray et al. |
| 2016/0175749 A1 | 6/2016 | Suda |
| 2016/0244677 A1 | 8/2016 | Froehle |
| 2016/0298851 A1 | 10/2016 | Brickwood et al. |
| 2016/0312127 A1 | 10/2016 | Frey et al. |
| 2016/0312130 A1 | 10/2016 | Majcher et al. |
| 2017/0009163 A1 | 1/2017 | Kraus et al. |
| 2017/0115190 A1 | 4/2017 | Hall et al. |
| 2017/0128859 A1* | 5/2017 | Levitt ................... B01D 29/117 |
| 2017/0131728 A1 | 5/2017 | Lambert et al. |
| 2017/0151526 A1* | 6/2017 | Cole ........................ F24F 13/28 |
| 2017/0183575 A1 | 6/2017 | Rubin-Pitel et al. |
| 2017/0198910 A1 | 7/2017 | Garg |
| 2017/0226434 A1 | 8/2017 | Zimmerman |
| 2017/0233670 A1 | 8/2017 | Feustel et al. |
| 2017/0234335 A1 | 8/2017 | LeBlanc et al. |
| 2017/0269559 A1 | 9/2017 | Trygstad |
| 2018/0017469 A1 | 1/2018 | English et al. |
| 2018/0037308 A1 | 2/2018 | Lee et al. |

(56) References Cited

U.S. PATENT DOCUMENTS

| | | |
|---|---|---|
| 2018/0080958 A1 | 3/2018 | Marchese et al. |
| 2018/0094809 A1 | 4/2018 | Lochschmied |
| 2018/0119039 A1 | 5/2018 | Tanaka et al. |
| 2018/0134974 A1 | 5/2018 | Weiss et al. |
| 2018/0163144 A1 | 6/2018 | Weiss et al. |
| 2018/0179457 A1 | 6/2018 | Mukherjee et al. |
| 2018/0202607 A1 | 7/2018 | McBride |
| 2018/0230389 A1 | 8/2018 | Moore et al. |
| 2018/0246142 A1 | 8/2018 | Glover |
| 2018/0355263 A1 | 12/2018 | Moore et al. |
| 2018/0361312 A1 | 12/2018 | Dutra e Mello et al. |
| 2018/0371325 A1 | 12/2018 | Streiff et al. |
| 2019/0002772 A1 | 1/2019 | Moore et al. |
| 2019/0010405 A1 | 1/2019 | Moore et al. |
| 2019/0010408 A1 | 1/2019 | Moore et al. |
| 2019/0016980 A1 | 1/2019 | Kar et al. |
| 2019/0093026 A1 | 3/2019 | Wohaibi et al. |
| 2019/0099706 A1 | 4/2019 | Sampath |
| 2019/0100702 A1 | 4/2019 | Cantley et al. |
| 2019/0127651 A1 | 5/2019 | Kar et al. |
| 2019/0128160 A1 | 5/2019 | Peng |
| 2019/0136144 A1 | 5/2019 | Wohaibi et al. |
| 2019/0153340 A1 | 5/2019 | Weiss et al. |
| 2019/0153942 A1 | 5/2019 | Wohaibi et al. |
| 2019/0169509 A1 | 6/2019 | Cantley et al. |
| 2019/0185772 A1 | 6/2019 | Berkhous et al. |
| 2019/0201841 A1 | 7/2019 | McClelland |
| 2019/0203130 A1 | 7/2019 | Mukherjee |
| 2019/0218466 A1 | 7/2019 | Slade et al. |
| 2019/0233741 A1 | 8/2019 | Moore et al. |
| 2019/0292465 A1 | 9/2019 | McBride |
| 2019/0338205 A1 | 11/2019 | Ackerson et al. |
| 2019/0382668 A1 | 12/2019 | Klussman et al. |
| 2019/0382672 A1 | 12/2019 | Sorensen |
| 2020/0041481 A1 | 2/2020 | Burgess |
| 2020/0049675 A1 | 2/2020 | Ramirez |
| 2020/0080881 A1 | 3/2020 | Langlois et al. |
| 2020/0095509 A1 | 3/2020 | Moore et al. |
| 2020/0123458 A1 | 4/2020 | Moore et al. |
| 2020/0181502 A1 | 6/2020 | Paasikallio et al. |
| 2020/0191385 A1 | 6/2020 | Carroll |
| 2020/0199462 A1 | 6/2020 | Klussman et al. |
| 2020/0208068 A1 | 7/2020 | Hossain et al. |
| 2020/0246743 A1 | 8/2020 | Sorensen |
| 2020/0291316 A1 | 9/2020 | Robbins et al. |
| 2020/0312470 A1 | 10/2020 | Craig et al. |
| 2020/0316513 A1* | 10/2020 | Zhao ............... B01D 46/88 |
| 2020/0332198 A1 | 10/2020 | Yang et al. |
| 2020/0353456 A1 | 11/2020 | Zalewski et al. |
| 2020/0378600 A1 | 12/2020 | Craig et al. |
| 2020/0385644 A1* | 12/2020 | Rogel ............... C10L 1/08 |
| 2021/0002559 A1 | 1/2021 | Larsen et al. |
| 2021/0003502 A1 | 1/2021 | Kirchmann et al. |
| 2021/0033631 A1 | 2/2021 | Field et al. |
| 2021/0103304 A1 | 4/2021 | Fogarty et al. |
| 2021/0115344 A1 | 4/2021 | Perkins et al. |
| 2021/0181164 A1 | 6/2021 | Shirkhan et al. |
| 2021/0213382 A1* | 7/2021 | Cole ............... F24F 11/56 |
| 2021/0238487 A1 | 8/2021 | Moore et al. |
| 2021/0253964 A1 | 8/2021 | Eller et al. |
| 2021/0253965 A1 | 8/2021 | Woodchick et al. |
| 2021/0261874 A1 | 8/2021 | Eller et al. |
| 2021/0284919 A1 | 9/2021 | Moore et al. |
| 2021/0292661 A1 | 9/2021 | Klussman et al. |
| 2021/0301210 A1 | 9/2021 | Timken et al. |
| 2021/0318280 A1 | 10/2021 | Ludlum |
| 2021/0396660 A1 | 12/2021 | Zarrabian |
| 2021/0403819 A1 | 12/2021 | Moore et al. |
| 2022/0040629 A1 | 2/2022 | Edmoundson et al. |
| 2022/0041939 A1 | 2/2022 | Tiitta et al. |
| 2022/0041940 A1 | 2/2022 | Pradeep et al. |
| 2022/0048019 A1 | 2/2022 | Zalewski et al. |
| 2022/0268694 A1 | 8/2022 | Bledsoe et al. |
| 2022/0298440 A1 | 9/2022 | Woodchick et al. |
| 2022/0299170 A1 | 9/2022 | Raynor et al. |
| 2022/0343229 A1 | 10/2022 | Gruber et al. |
| 2022/0357303 A1 | 11/2022 | Zhu et al. |
| 2023/0015077 A1 | 1/2023 | Kim |
| 2023/0078852 A1 | 3/2023 | Campbell et al. |
| 2023/0080192 A1 | 3/2023 | Bledsoe et al. |
| 2023/0082189 A1 | 3/2023 | Bledsoe et al. |
| 2023/0084329 A1 | 3/2023 | Bledsoe et al. |
| 2023/0087063 A1 | 3/2023 | Mitzel et al. |
| 2023/0089935 A1 | 3/2023 | Bledsoe et al. |
| 2023/0093452 A1 | 3/2023 | Sexton et al. |
| 2023/0111609 A1 | 4/2023 | Sexton et al. |
| 2023/0113140 A1 | 4/2023 | Larsen et al. |
| 2023/0118319 A1 | 4/2023 | Sexton et al. |
| 2023/0220286 A1 | 7/2023 | Cantley et al. |
| 2023/0241548 A1 | 8/2023 | Holland et al. |
| 2023/0242837 A1 | 8/2023 | Short et al. |
| 2023/0259080 A1 | 8/2023 | Whikehart et al. |
| 2023/0259088 A1 | 8/2023 | Borup et al. |
| 2023/0272290 A1 | 8/2023 | Larsen et al. |
| 2023/0295528 A1 | 9/2023 | Eller et al. |
| 2023/0332056 A1 | 10/2023 | Larsen et al. |
| 2023/0332058 A1 | 10/2023 | Larsen et al. |
| 2023/0357649 A1 | 11/2023 | Sexton et al. |
| 2023/0400184 A1 | 12/2023 | Craig |
| 2023/0416615 A1 | 12/2023 | Larsen |
| 2023/0416638 A1 | 12/2023 | Short |
| 2024/0011898 A1 | 1/2024 | Bledsoe, Jr. et al. |
| 2024/0115996 A1 | 4/2024 | Rudd |
| 2024/0117262 A1 | 4/2024 | Eller |
| 2024/0118194 A1 | 4/2024 | Bledsoe, Jr. |
| 2024/0124790 A1 | 4/2024 | Sexton |
| 2024/0132786 A1 | 4/2024 | Sexton |
| 2024/0182803 A1 | 6/2024 | Woodchick |
| 2024/0294837 A1 | 9/2024 | Larsen |
| 2024/0327723 A1 | 10/2024 | Larsen |
| 2024/0337352 A1 | 10/2024 | Craig |
| 2024/0377287 A1 | 11/2024 | Markins |
| 2024/0399279 A1 | 12/2024 | Duong |

FOREIGN PATENT DOCUMENTS

| | | |
|---|---|---|
| CA | 2949201 | 11/2015 |
| CA | 2822742 | 12/2016 |
| CA | 3009808 | 7/2017 |
| CA | 2904903 | 8/2020 |
| CA | 3077045 | 9/2020 |
| CA | 2947431 | 3/2021 |
| CA | 3004712 | 6/2021 |
| CA | 2980055 | 12/2021 |
| CA | 2879783 | 1/2022 |
| CA | 2991614 | 1/2022 |
| CA | 2980069 | 11/2022 |
| CA | 3109606 | 12/2022 |
| CH | 432129 | 3/1967 |
| CN | 2128346 | 3/1993 |
| CN | 201264907 Y | 7/2009 |
| CN | 201306736 | 9/2009 |
| CN | 201940168 | 8/2011 |
| CN | 102120138 | 12/2012 |
| CN | 203453713 | 2/2014 |
| CN | 103627433 | 3/2014 |
| CN | 203629938 | 6/2014 |
| CN | 203816490 | 9/2014 |
| CN | 104353357 | 2/2015 |
| CN | 204170623 | 2/2015 |
| CN | 103331093 | 4/2015 |
| CN | 204253221 | 4/2015 |
| CN | 204265565 | 4/2015 |
| CN | 105148728 | 12/2015 |
| CN | 204824775 | 12/2015 |
| CN | 103933845 | 1/2016 |
| CN | 105289241 | 2/2016 |
| CN | 105536486 | 5/2016 |
| CN | 105804900 | 7/2016 |
| CN | 103573430 | 8/2016 |
| CN | 205655095 | 10/2016 |
| CN | 104326604 | 11/2016 |
| CN | 104358627 | 11/2016 |
| CN | 106237802 | 12/2016 |

(56) References Cited

FOREIGN PATENT DOCUMENTS

| | | | | |
|---|---|---|---|---|
| CN | 205779365 | 12/2016 | | |
| CN | 106407648 | 2/2017 | | |
| CN | 105778987 | 8/2017 | | |
| CN | 207179722 | 4/2018 | | |
| CN | 207395575 | 5/2018 | | |
| CN | 108179022 | 6/2018 | | |
| CN | 108704478 | 10/2018 | | |
| CN | 109126458 | 1/2019 | | |
| CN | 109423345 | 3/2019 | | |
| CN | 109499365 | 3/2019 | | |
| CN | 109705939 | 5/2019 | | |
| CN | 109722303 | 5/2019 | | |
| CN | 110129103 | 8/2019 | | |
| CN | 110229686 | 9/2019 | | |
| CN | 209451617 | 10/2019 | | |
| CN | 110987862 | 4/2020 | | |
| CN | 111336612 | A | 6/2020 | |
| CN | 213762571 | U | 7/2021 | |
| CN | 213824075 | U | 7/2021 | |
| CN | 214619622 | 11/2021 | | |
| CN | 215263512 | U | 12/2021 | |
| CN | 215288592 | 12/2021 | | |
| CN | 113963818 | 1/2022 | | |
| CN | 114001278 | 2/2022 | | |
| CN | 217431673 | 9/2022 | | |
| CN | 218565442 | 3/2023 | | |
| DE | 10179 | 6/1912 | | |
| DE | 3721725 | 1/1989 | | |
| DE | 19619722 | 11/1997 | | |
| DE | 102010017563 | 12/2011 | | |
| DE | 102014009231 | A1 * | 12/2015 | ......... B01D 46/008 |
| EP | 0142352 | 5/1985 | | |
| EP | 0527000 | 2/1993 | | |
| EP | 0783910 | A1 | 7/1997 | |
| EP | 0949318 | 10/1999 | | |
| EP | 0783910 | B1 | 12/2000 | |
| EP | 0801299 | 3/2004 | | |
| EP | 1413712 | 4/2004 | | |
| EP | 1600491 | 11/2005 | | |
| EP | 1870153 | A1 * | 12/2007 | ......... B01D 46/0058 |
| EP | 2047905 | 4/2009 | | |
| EP | 2955345 | 12/2015 | | |
| EP | 3130773 | 2/2017 | | |
| EP | 3139009 | 3/2017 | | |
| EP | 3239483 | 11/2017 | | |
| EP | 3085910 | 8/2018 | | |
| EP | 3355056 | 8/2018 | | |
| EP | 2998529 | 2/2019 | | |
| EP | 3441442 | 2/2019 | | |
| EP | 3569988 | 11/2019 | | |
| EP | 3878926 | 9/2021 | | |
| FR | 2357630 | 2/1978 | | |
| FR | 3004722 | 3/2016 | | |
| FR | 3027909 | 5/2016 | | |
| FR | 3067036 | 12/2018 | | |
| FR | 3067037 | 12/2018 | | |
| FR | 3072684 | 4/2019 | | |
| FR | 3075808 | 6/2019 | | |
| GB | 775273 | 5/1957 | | |
| GB | 933618 | 8/1963 | | |
| GB | 1207719 | 10/1970 | | |
| GB | 2144526 | 3/1985 | | |
| GB | 2516441 | A * | 1/2015 | ......... B01D 46/0086 |
| IN | 202111016535 | 7/2021 | | |
| JP | 59220609 | 12/1984 | | |
| JP | 2003129067 | 5/2003 | | |
| JP | 2005147478 | A | 6/2005 | |
| JP | 3160405 | 6/2010 | | |
| JP | 2015059220 | 3/2015 | | |
| JP | 2019014275 | 1/2019 | | |
| KR | 101751923 | 7/2017 | | |
| KR | 101823897 | 3/2018 | | |
| KR | 20180095303 | 8/2018 | | |
| KR | 20190004474 | 1/2019 | | |
| KR | 20190004475 | 1/2019 | | |
| RU | 2673558 | 11/2018 | | |
| RU | 2700705 | 9/2019 | | |
| RU | 2760879 | 12/2021 | | |
| TW | 320682 | 11/1997 | | |
| WO | 94/08225 | 4/1994 | | |
| WO | 199640436 | 12/1996 | | |
| WO | 1997033678 | 9/1997 | | |
| WO | 199803249 | 1/1998 | | |
| WO | 1999041591 | 8/1999 | | |
| WO | 2001051588 | 7/2001 | | |
| WO | 2002038295 | 5/2002 | | |
| WO | 2006126978 | 11/2006 | | |
| WO | 2008088294 | 7/2008 | | |
| WO | 2010/144191 | 12/2010 | | |
| WO | 2012026302 | 3/2012 | | |
| WO | 2012062924 | 5/2012 | | |
| WO | 2012089776 | 7/2012 | | |
| WO | 2012108584 | 8/2012 | | |
| WO | 2014053431 | 4/2014 | | |
| WO | 2014096703 | 6/2014 | | |
| WO | 2014096704 | 6/2014 | | |
| WO | 2014191004 | 7/2014 | | |
| WO | 2014177424 | 11/2014 | | |
| WO | 2014202815 | 12/2014 | | |
| WO | 2016167708 | 10/2016 | | |
| WO | 2017067088 | 4/2017 | | |
| WO | 2017207976 | 12/2017 | | |
| WO | 2018017664 | 1/2018 | | |
| WO | 2018073018 | 4/2018 | | |
| WO | 2018122274 | 7/2018 | | |
| WO | 2018148675 | 8/2018 | | |
| WO | 2018148681 | 8/2018 | | |
| WO | 2018231105 | 12/2018 | | |
| WO | 2019053323 | 3/2019 | | |
| WO | 2019104243 | 5/2019 | | |
| WO | 2019155183 | 8/2019 | | |
| WO | 2019178701 | 9/2019 | | |
| WO | 2020035797 | 2/2020 | | |
| WO | 2020160004 | 8/2020 | | |
| WO | 2021058289 | 4/2021 | | |
| WO | 2022133359 | 6/2022 | | |
| WO | 2022144495 | 7/2022 | | |
| WO | 2022149501 | 7/2022 | | |
| WO | 2022219234 | 10/2022 | | |
| WO | 2022220991 | 10/2022 | | |
| WO | 2023020797 | 2/2023 | | |
| WO | 2023038579 | 3/2023 | | |
| WO | 2023137304 | 7/2023 | | |
| WO | 2023164683 | 8/2023 | | |
| WO | 2023242308 | 12/2023 | | |

OTHER PUBLICATIONS

Platvoet et al., Process Burners 101, American Institute of Chemical Engineers, Aug. 2013.

Luyben, W. L., Process Modeling, Simulation, and Control for Chemical Engineers, Feedforward Control, pp. 431-433.

Cooper et al., Calibration transfer of near-IR partial least squares property models of fuels using standards, Wiley Online Library, Jul. 19, 2011.

ABB Measurement & Analytics, Using FT-NIR as a Multi-Stream Method for CDU Optimization, Nov. 8, 2018.

Modcon Systems LTD., On-Line NIR Analysis of Crude Distillation Unit, Jun. 2008.

ABB Measurement & Analytics, Crude distillation unit (CDU) optimization, 2017.

Guided Wave Inc., The Role of NIR Process Analyzers in Refineries to Process Crude Oil into Useable Petrochemical Products, 2021.

ABB Measurement & Analytics, Optimizing Refinery Catalytic Reforming Units with the use of Simple Robust On-Line Analyzer Technology, Nov. 27, 2017, https://www.azom.com/article.aspx?ArticleID=14840.

Bueno, Alexis et al., Characterization of Catalytic Reforming Streams by NIR Spectroscopy, Energy & Fuels 2009, 23, 3172-3177, Apr. 29, 2009.

Caricato, Enrico et al, Catalytic Naphtha Reforming—a Novel Control System for the Bench-Scale Evaluation of Commerical

(56) References Cited

OTHER PUBLICATIONS

Continuous Catalytic Regeneration Catalysts, Industrial of Engineering Chemistry Research, ACS Publications, May 18, 2017.
Alves, J. C. L., et al., Diesel Oil Quality Parameter Determinations Using Support Vector Regression and Near Infrared Spectroscopy for Hydrotreationg Feedstock Monitoring, Journal of Near Infrared Spectroscopy, 20, 419-425 (2012), Jul. 23, 2012.
Rodriguez, Elena et al., Coke deposition and product distribution in the co-cracking of waste polyolefin derived streams and vacuum gas oil under FCC unit conditions, Fuel Processing Technology 192 (2019), 130-139.
Passamonti, Francisco J. et al., Recycling of waste plastics into fuels, PDPE conversion in FCC, Applied Catalysis B: Environmental 125 (2012), 499-506.
De Rezende Pinho, Andrea et al., Fast pyrolysis oil from pinewood chips co-processing with vacuum gas oil in an FCC unit for second generation fuel production, Fuel 188 (2017), 462-473.
Niaei et al., Computational Study of Pyrolysis Reactions and Coke Deposition in Industrial Naphtha Cracking, P.M.A. Sloot et al., Eds.: ICCS 2002, LNCS 2329, pp. 723-732, 2002.
Hanson et al., An atmospheric crude tower revamp, Digital Refining, Article, Jul. 2005.
Lopiccolo, Philip, Coke trap reduces FCC slurry exchanger fouling for Texas refiner, Oil & Gas Journal, Sep. 8, 2003.
Martino, Germain, Catalytic Reforming, Petroleum Refining Conversion Processes, vol. 3, Chapter 4, pp. 101-168, 2001.
Baukal et al., Natural-Draft Burners, Industrial Burners Handbook, CRC Press 2003.
Spekuljak et al., Fluid Distributors for Structured Packing Colums, AICHE, Nov. 1998.
Hemler et al., UOP Fluid Catalytic Cracking Process, Handbook of Petroleum Refining Processes, 3rd ed., McGraw Hill, 2004.
United States Department of Agriculture, NIR helps Turn Vegetable Oil into High-Quality Biofuel, Agricultural Research Service, Jun. 15, 1999.
NPRA, 2006 Cat Cracker Seminar Transcript, National Petrochemical & Refiners Association, Aug. 1-2, 2006.
Niccum, Phillip K. et al. KBR, CatCracking.com, More Production—Less Risk!, Twenty Questions: Identify Probably Cuase of High FCC Catalyst Loss, May 3-6, 2011.
NPRA, Cat-10-105 Troubleshooting FCC Catalyst Losses, National Petrochemical & Refiners Association, Aug. 24-25, 2010.
Fraser, Stuart, Distillation in Refining, Distillation Operation and Applications (2014), pp. 155-190 (Year: 2014).
Yasin et al., Quality and chemistry of crude oils, Journal of Petroleum Technology and Alternative Fuels, vol. 4(3), pp. 53-63, Mar. 2013.
Penn State, Cut Points, https://www.e-education.psu.edu/fsc432/content/cut-points, 2018.
The American Petroleum Institute, Petroleum HPV Testing Group, Heavy Fuel Oils Category Analysis and Hazard Characterization, Dec. 7, 2012.
Increase Gasoline Octane and Light Olefin Yeilds with ZSM-5, vol. 5, Issue 5, http://www.refiningonline.com/engelhardkb/crep/TCR4_35.htm.
Fluid Catalytic Cracking and Light Olefins Production, Hydrocarbon Publishing Company, 2011, http://www.hydrocarbonpublishing.com/store10/product.php?productid+b21104.
Zhang et al., Multifunctional two-stage riser fluid catalytic cracking process, Springer Applied Petrocchemical Research, Sep. 3, 2014.
Reid, William, Recent trends in fluid catalytic cracking patents, part V: reactor section, Dilworth IP, Sep. 3, 2014.
Akah et al., Maximizing propylene production via FCC technology, SpringerLink, Mar. 22, 2015.
Vogt et al., Fluid Catalytic Cracking: Recent Developments on the Grand Old Lady of Zeolite Catalysis, Royal Society of Chemistry, Sep. 18, 2015.
Zulkefi et al., Overview of H2S Removal Technologies from Biogas Production, International Journal of Applied Engineering Research ISSN 0973-4562, vol. 11, No. 20, pp. 10060-10066, © Research India Publications, 2016.
Vivek et al., Assessment of crude oil blends, refiner's assessment of the compatibility of opportunity crudes in blends aims to avoid the processing problems introduced by lower-quality feedstocks, www.digitalrefining.com/article/10000381, 2011.
International Standard, ISO 8217, Petroleum products—Fuels (class F)—Specifications of marine fuels, Sixth Edition, 2017.
International Standard, ISO 10307-1, Petroleum products—Total sediment in residual fuel oils—, Part 1: Determination by hot filtration, Second Edition, 2009.
International Standard, ISO 10307-2, Petroleum products—Total sediment in residual fuel oils—, Part 2: Determination using standard procedures for aging, Second Edition, 2009.
Ebner et al., Deactivatin and durability of the catalyst for Hotspot™ natural gas processing, OSTI, 2000, https://www.osti/gov/etdeweb/servlets/purl/20064378, (Year: 2000).
Morozov et al., Best Practices When Operating a Unit for Removing Hydrogen Sulfide from Residual Fuel Oil, Chemistry and Technology of Fuels and Oils, vol. 57, No. 4, Sep. 2001.
Calbry-Muzyka et al., Deep removal of sulfur and trace organic compounds from biogas to protect a catalytic methananation reactor, Chemical Engineering Joural 360, pp. 577-590, 2019.
Cheah et al., Review of Mid- to High-Tempearture Sulfur Sorbents for Desulfurization of Biomass- and Coal-derived Syngas, Energy Fuels 2009, 23, pp. 5291-5307, Oct. 16, 2019.
Mandal et al., Simultaneous absorption of carbon dioxide of hydrogen sulfide into aqueous blends of 2-amino-2-methyl-1 propanol and diethanolamine, Chemical Engineering Science 60, pp. 6438-6451, 2005.
Meng et al., In bed and downstream hot gas desulphurization during solid fuel gasification: A review, Fuel Processing Technology 91, pp. 964-981, 2010.
Okonkwo et al., Role of Amine Structure on Hydrogen Sulfide Capture from Dilute Gas Streams Using Solid Adsorbents, Energy Fuels, 32, pp. 6926-6933, 2018.
Okonkwo et al., Selective removal of hydrogen sulfide from simulated biogas streams using sterically hindered amine adsorbents, Chemical Engineering Journal 379, pp. 122-349, 2020.
Seo et al., Methanol absorption characteristics for the removal of H2S (hydrogen sulfide), COS (carbonyl sulfide) and CO2 (carbon dioxide) in a pilot-scale biomass-to-liquid process, Energy 66, pp. 56-62, 2014.
Bollas et al., "Modeling Small-Diameter FCC Riser Reactors. A Hydrodynamic and Kinetic Approach", Industrial and Engineering Chemistry Research, 41(22), 5410-5419, 2002.
Voutetakis et al., "Computer Application and Software Development for the Automation of a Fluid Catalytic Cracking Pilot Plant—Experimental Results", Computers & Chemical Engineering, vol. 20 Suppl., S1601-S1606, 1996.
"Development of Model Equations for Predicting Gasoline Blending Properties", Odula et al., American Journal of Chemical Engineering, vol. 3, No. 2-1, 2015, pp. 9-17.
Lloyd's Register, Using technology to trace the carbon intensity of sustainable marine fuels, Feb. 15, 2023.
Pashikanti et al., "Predictive modeling of large-scale integrated refinery reaction and fractionation systems from plant data. Part 3: Continuous Catalyst Regeneration (CCR) Reforming Process," Energy & Fuels 2011, 25, 5320-5344 (Year: 2011).
Swagelok, Grab Sampling Systems Application Guide, 53 pages.
Frank et al., "Fuel Tank and Charcoal Canister Fire Hazards during EVAP System Leak Testing", SAE International, 2007 World Congress, Detroit, Michigan, Apr. 16-19, 2007, 11 pages.
Doolin et al., "Catalyst Regeneration and Continuous Reforming Issues", Catalytic Naptha Reforming, 2004.
Lerh et al., Feature: IMO 2020 draws more participants into Singapore's bunkering pool., S&P Global Platts, www.spglobal.com, Sep. 3, 2019.

(56) References Cited

OTHER PUBLICATIONS

Cremer et al., Model Based Assessment of the Novel Use of Sour Water Stripper Vapor for NOx Control in CO Boilers, Industrial Combustion Symposium, American Flame Research Committee 2021, Nov. 19, 2021.

Frederick et al., Alternative Technology for Sour Water Stripping, University of Pennsylvania, Penn Libraries, Scholarly Commons, Apr. 20, 2018.

Da Vinci Laboratory Solutions B. V., DVLS Liquefied Gas Injector, Sampling and analysis of liquefied gases, https://www.davinci-ls.com/en/products/dvls-products/dvls-liquefied-gas-injector.

Wasson ECE Instrumentation, LPG Pressurization Station, https://wasson-ece.com/products/small-devices/lpg-pressurization-station.

Mechatest B. V., Gas & Liquefied Gas Sampling Systems, https://www.mechatest.com/products/gas-sampling-system/.

La Rivista dei Combustibili, The Fuel Magazine, vol. 66, File 2, 2012.

* cited by examiner

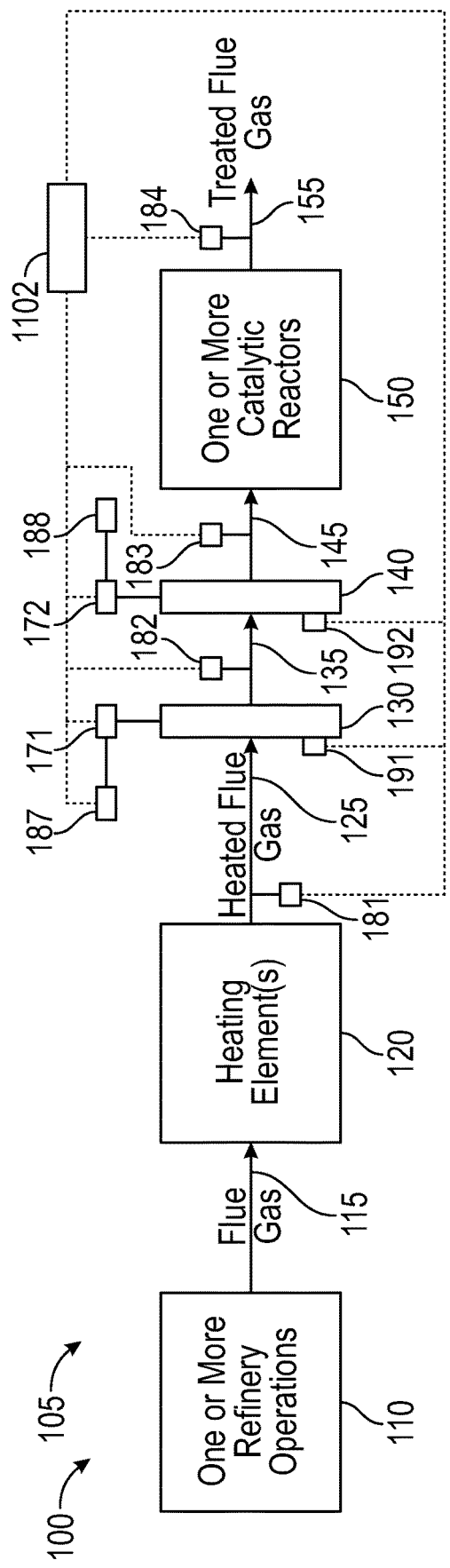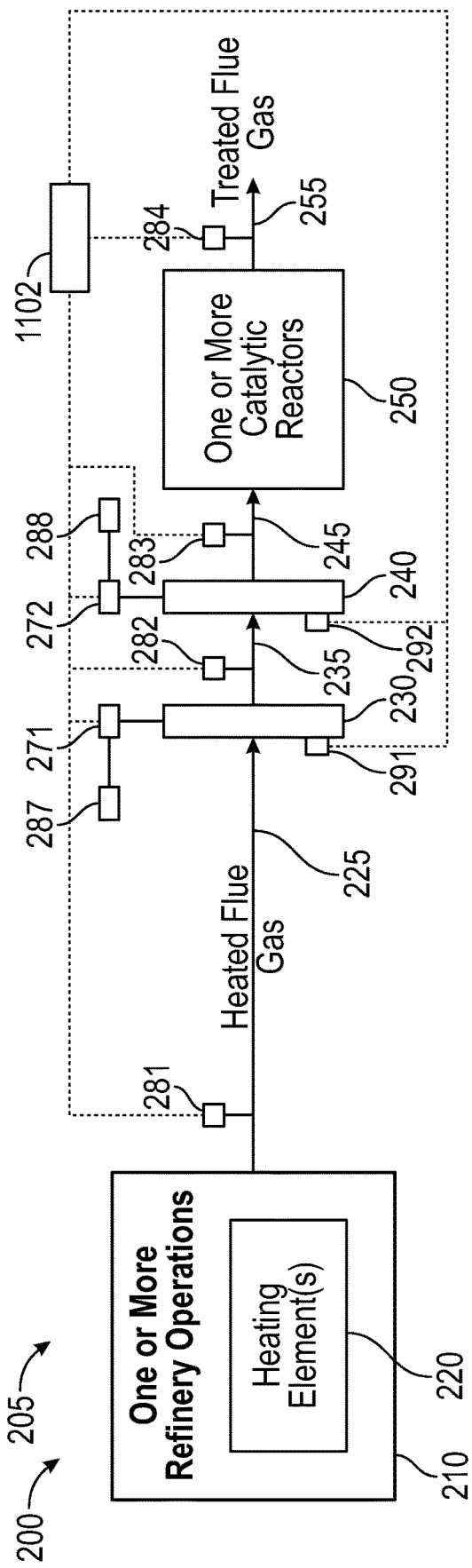

REMOVABLE FLUE GAS STRAINER AND ASSOCIATED METHODS

CROSS-REFERENCE TO RELATED APPLICATIONS

This application claims priority to, and the benefit of, U.S. Provisional Application No. 63/386,586, filed Dec. 8, 2022, titled "Removable Flue Gas Strainer and Associated Methods," the disclosure of which is incorporated herein by reference in its entirety.

TECHNICAL FIELD

The present disclosure generally relates to apparatuses, systems, and methods for removing solid particulates from a fluid stream upstream of a catalyst. More specifically, the present disclosure relates to, among other embodiments, apparatuses, systems and methods for removing heating element-derived fiber and dust particles from heated fluid streams to reduce risk or prevent the fouling of downstream catalysts and equipment such as by the solid particulates.

BACKGROUND

Many industrial processes involve the use of heaters and boilers to heat chemical components of fluid streams upstream of an environmental catalyst. Often, industrial equipment employed upstream of an environmental catalyst, including heating elements used in process heaters and boilers, shed fibers and dust particles that may disrupt downstream catalysts and equipment. This may be particularly true when heating elements having fiber refractories are used. In such instances, fibers and other solid particulates from the heating element may lay down on the catalyst face or otherwise foul downstream catalysts and other equipment causing unplanned unit shutdowns and lost profits. Accordingly, Applicant has recognized that apparatuses, methods, and systems for preventing the fouling of downstream catalysts without shutting down industrial process streams are desirable.

SUMMARY

To address these shortcomings, Applicant has developed apparatuses, systems, and methods for mitigating catalyst fouling to allow the process plants or streams to continue to operate smoothly or without the need for shutting down industrial process plants or streams. In particular, embodiments of the presently disclosed apparatuses, systems, and methods are operable to reduce catalyst fouling by removing solid particulates from a heated fluid stream upstream of a catalyst by use of one or more removable flue gas strainers, for example, that may be cleaned or serviced without ceasing or disrupting the heating or catalytic operations. In certain embodiments, the presently disclosed apparatuses, systems, and methods may be used to protect catalysts used in fluid catalytic cracking (FCC) units. In particular, in certain embodiments, one or more of the presently disclosed flue gas strainer apparatuses may be installed in flue gas ducting upstream of one or more fluid catalytic cracking (FCC) units.

Embodiments of a flue gas strainer apparatus for removing solid particulates from a heated fluid stream upstream of a catalyst also are provided. In certain embodiments, the flue gas strainer apparatus may include a housing having a front end and a back end. The housing may also include a receiving portion, an outer edge, an inner edge, and an inner bore extending from the front end to the back end of the housing along the inner edge. The inner bore may be operable to allow a heated fluid stream to pass therethrough. The removable flue gas strainer may also include a moveable strainer portion having one or more removable mesh portions. Each of the one or more removable mesh portions may include a plurality of pores and may be configured to capture solid particulates suspended in the heated fluid stream while providing pores for allowing the heated fluid stream to pass therethrough. The one or more removable mesh portions may be operable to be removingly received in the receiving portion of the housing such that in a first received configuration, the one or more removable mesh portions are operable to capture solid particulates suspended in the heated fluid stream passing through the inner bore of the housing. In a second retracted configuration, the one or more removable mesh portions are operable to be retracted such that the mesh portion is outside the inner bore of the housing and operable to be cleaned of captured solid particulates while the heated fluid stream continues to flow through the inner bore of the housing.

In certain embodiments, the flue gas strainer apparatus is configured to be positioned in a heated fluid stream such that the outer edge of the housing sealingly engages a duct containing the heated fluid stream. In certain embodiments, the outer edge of the housing has one or more flanges operable to sealingly engage the duct containing the heated fluid stream.

In certain embodiments of the flue gas strainer apparatus, the receiving portion of the housing may be disposed between a front end and a back end of the housing. In some embodiments, for example, the receiving portion may comprise a slot in the housing disposed between the front end and the back end of the housing. In certain embodiments, the flue gas strainer apparatus may include a means for moving or retracting the moveable strainer portion. In such embodiments, the means for moving or retracting the moveable strainer portion may include a motor coupled to a tether that is coupled to the moveable strainer portion. In certain embodiments, the flue gas strainer apparatus may further include one or more sealing elements operable to form a seal around the moveable strainer portion and/or the one or more removable mesh portions once received in the receiving portion.

In certain embodiments of the flue gas strainer apparatus, the moveable strainer portion may be operable to retract or otherwise move such that the one or more removable mesh portions are remove from the heated fluid stream so that the one or more mesh portions may be cleaned of captured solid particulates without disrupting the heated fluid stream flowing through the inner bore or disrupting one or more industrial operations relying on the flow of the heated fluid stream. In certain embodiments, the flue gas strainer apparatus may further include a means for moving or advancing the moveable strainer portion such that the one or more mesh portions of the moveable strainer portion are inserted into the inner bore of the housing from a position outside the inner bore of the housing.

In certain embodiments, the moveable strainer portion of the flue gas strainer apparatus may include a support frame coupling the one or more mesh portions to the means for moving the moveable strainer portion. The support frame may be coupled to one or more edges of the one or more mesh portions.

In certain embodiments, the moveable strainer portion comprises a plurality of removable mesh portions. In some instances, the plurality of removable mesh portions may be coupled together by the support frame. In certain embodiments, the removable mesh portions may be spaced apart on the support frame and/or the moveable strainer portion such that when at least one mesh portion is inserted into the inner bore of the housing, at least one other mesh portion is positioned outside the inner bore of the housing. In certain embodiments, the means for moving the moveable strainer portion may further comprise a means for rotating the plurality of mesh portions into and out of the inner bore of the housing such that when a fouled mesh portion comprising captured particles is removed from the inner bore of the housing, a clean mesh portion is inserted into the inner bore of the same housing by the same motion of the moveable strainer portion.

A method of reacting a heated fluid stream with a catalytic reactor also is provided, according to certain embodiments of the present disclosure. In certain embodiments, the method may include providing one or more flue gas strainer apparatuses positioned in a flowpath of a heated fluid stream between one or more heating elements and one or more catalytic reactors. The one or more flue gas strainer apparatuses, for example, may include a housing having an inner bore operable to receive the heated fluid stream therethrough and a moveable strainer portion that includes one or more removable mesh portions. The one or more removable mesh portions may have a plurality of pores and be configured to capture solid particulates suspended in the heated fluid stream. The method also may include causing the capture of solid particulates suspended in the heated fluid stream on or about the one or more removable mesh portions of the one or more flue gas strainer apparatuses. The method may also include removing or retracting the one or more removable mesh portions from the flowpath of the heated fluid stream without disrupting the flow of the heated fluid stream through the inner bore. The method may further include cleaning the one or more removable mesh portions of the moveable strainer portion to substantially remove the captured solid particulates, and re-inserting the one or more removable mesh portions into the flowpath of the heated fluid stream.

In certain embodiments, the one or more flue gas strainer apparatuses employed in the method may include a first flue gas strainer apparatus and a second flue gas strainer apparatus. The first and second flue gas strainer apparatuses may be arranged in series and operable to be deployed in a first received configuration and a second retracted configuration. For example, in a first received configuration, at least one of the on or more removable mesh portions of the moveable strainer portion may be received in the housing and operable to capture solid particulates suspended in the heated fluid stream passing through the inner bore of the housing, and in a second retracted configuration, the at least one of the one or more removable strainer portions may be retracted from the inner bore of the housing and operable to have the mesh portion available to be substantially cleaned of captured solid particulates while the heated fluid stream continues to flow through the inner bore of the housing.

In such embodiments, the method may also include deploying the first flue gas strainer apparatus in the first received configuration so as to cause the capture of solid particulates suspended in the heated fluid stream on or about at least one of the one or more removable mesh portions of the first flue gas strainer apparatus. The method may further include deploying the first flue gas strainer apparatus in the second retracted configuration while the second flue gas strainer apparatus is deployed in the first received configuration. The method may also include cleaning the at least one of the one or more removable mesh portions of the first flue gas strainer apparatus so as to substantially remove the captured solid particulates, and capturing solid particulates on or about the at least one of the one or more removable mesh portions of the second flue gas strainer apparatus substantially contemporaneous with the cleaning of the at least one of the one or more removable mesh portions of the first flue gas strainer apparatus.

In certain embodiments, the method may also include deploying, after substantial removal of the captured solid particulates from the one or more removable mesh portions, the first flue gas strainer apparatus in the first received configuration so as to cause the capture of solid particulates suspended in the heated fluid stream. The method may also include deploying the second flue gas strainer apparatus in the second retracted configuration while the first flue gas strainer apparatus is deployed in the first received configuration. The method may further include cleaning the one or more removable mesh portions of the second flue gas strainer apparatus so as to substantially remove the captured solid particulates, and causing the capture of solid particulates on or about the one or more removable mesh portions of the first flue gas strainer apparatus substantially contemporaneous with the cleaning of the one or more removable mesh portions of the second flue gas strainer apparatus.

In certain embodiments, the method further may include heating a fluid, at the one or more heating elements, to generate a heated fluid stream and supplying the heated fluid stream to one or more flue gas strainer apparatuses to produce a strained heated fluid stream. In this embodiment of the method, the one or more flue gas strainer apparatuses may be operable to remove at least a portion of the solid particulates suspended in the heated fluid stream. The method may further include supplying the strained fluid stream to one or more catalytic reactors to produce a treated fluid gas stream.

In some embodiments, the catalytic reactor used in the method may include a catalyst having an average pore size that is larger than the average pore size of the one or more removable mesh portions of the first and second flue gas strainer apparatuses. The solid particulates removed by the method may, in certain embodiments, be derived from the one or more heating elements. In some instances, the one or more heating elements may include a refractory heating element or a fiber refractory heating element. In some embodiments, the one or more catalytic reactors employed in the method may be part of a fluid catalytic cracking (FCC) unit. In certain embodiments, the heated fluid stream may be a flue gas stream generated by one or more refinery operations.

A system for reacting a heated fluid stream with a catalytic reactor is also provided, according to certain embodiments of the present disclosure. In certain embodiments, the system may include one or more heating elements operable to heat a fluid stream to produce a heated fluid stream. The system may also include one or more catalytic reactors that include a catalyst operable to react with one or more components in the heated fluid stream to produce a treated fluid stream. The system may also include one or more flue gas strainer apparatuses positioned in a flowpath of the heated fluid stream between the one or more heating elements and the one or more catalytic reactors. The one or more flue gas strainer apparatuses are operable to receive the heated fluid stream and capture solid particulates suspended in the heated fluid stream on one or more removable mesh portions. The one or more removable mesh portions are operable to be removed from flowpath of the heated fluid stream in order to be cleaned while the heated fluid stream continues to flow to the or more catalytic reactors.

In certain embodiments, each of the flue gas strainer apparatuses employed in the system may include a housing having a front end and a back end. The housing may also include a receiving portion, an outer edge, an inner edge, and an inner bore extending from the front end to the back end of the housing along the inner edge. The inner edge also may define an inner bore operable to allow the heated fluid stream to pass therethrough. The flue gas strainer apparatus may also include a moveable strainer portion comprising one or more removable mesh portions having a plurality of pores and configured to capture solid particulates suspended in the heated fluid stream. The moveable strainer portion and/or the one or more removable mesh portions contained thereon may be operable to be removingly received in the receiving portion of the housing such that in a first received configuration, the one or more removable mesh portions of the moveable strainer portion is operable to capture solid particulates suspended in the heated fluid stream passing through the inner bore of the housing. In a second retracted configuration, the one or more removable mesh portions are operable to be cleaned of captured solid particulates while the heated fluid stream continues to flow through the inner bore of the housing.

In certain embodiments, the system also may include a first flue gas strainer apparatus and a second flue gas strainer apparatus. In such embodiments, the first and second flue gas strainer apparatuses may be arranged in series and operable to be deployed in a first received configuration and a second retracted configuration. In the first received configuration, the moveable strainer portion and/or the one or more removable mesh portions contained thereon is received in the housing and operable to capture solid particulates suspended in the heated fluid stream passing through the inner bore of the housing. In the second retracted configuration, the moveable strainer portion and/or the one or more removable mesh portions may be retracted from the inner bore of the housing and operable to have the mesh portion available to be substantially cleaned of captured solid particulates while the heated fluid stream continues to flow through the inner bore of the housing. In such embodiments, the first and second flue gas strainer apparatuses may be configured such that the one or more removable mesh portions of a respective one of the flue gas strainer apparatuses may be cleaned outside the flowpath of the heated fluid stream while the one or more removable mesh portions of the other flue gas strainer apparatus is operable to capture solid particulates suspended in the heated fluid stream. As a result, operation of an embodiment of the system may occur continuously without the need to cease operations to clean the one or more removable mesh portions and the one or more removable mesh portions of at least one of the removable flue gas strainer apparatuses may be positioned and operable to capture solid particulates from the heated fluid stream.

In certain embodiments of the system, the one or more removable mesh portions of the one or more flue gas strainer apparatuses includes a plurality of pores having an average pore size smaller than the average pore size of the catalyst used in the catalytic reactor. In at least some embodiments of the system, at least one of the one or more heating elements may be a fiber refractory heating element and at least a portion of the solid particulates is derived from the one or more heating elements. In some embodiments of the system, the heated fluid stream may be a flue gas stream generated by one or more refinery operations.

Still other aspects and advantages of these exemplary embodiments and other embodiments, are discussed in detail herein. Moreover, it is to be understood that both the foregoing information and the following detailed description provide merely illustrative examples of various aspects and embodiments and are intended to provide an overview or framework for understanding the nature and character of the claimed aspects and embodiments. Accordingly, these and other advantages and features of the present disclosure, will become apparent through reference to the following description and the accompanying drawings. Furthermore, it is to be understood that the features of the various embodiments described herein are not mutually exclusive and may exist in various combinations and permutations.

BRIEF DESCRIPTION OF THE DRAWINGS

The accompanying drawings, which are included to provide a further understanding of the embodiments of the present disclosure, are incorporated in and constitute a part of this specification, illustrate embodiments of the present disclosure, and together with the detailed description, serve to explain principles of the embodiments discussed herein. No attempt is made to show structural details of this disclosure in more detail than may be necessary for a fundamental understanding of the embodiments discussed herein and the various ways in which they may be practiced. According to common practice, the various features of the drawings discussed below are not necessarily drawn to scale. Dimensions of various features and elements in the drawings may be expanded or reduced to more clearly illustrate embodiments of the disclosure.

FIG. 1 is a graphical representation of a system and method for reacting a heated fluid stream with a catalytic reactor which may employ one or more flue gas strainer apparatuses having one or more removable mesh portions, according to an exemplary embodiment of the present disclosure.

FIG. 2 is a graphical representation of a system and method for reacting a heated fluid stream with a catalytic reactor which may employ one or more flue gas strainer apparatuses having one or more removable mesh portions, according to an exemplary embodiment of the present disclosure.

DETAILED DESCRIPTION

Figure 3:
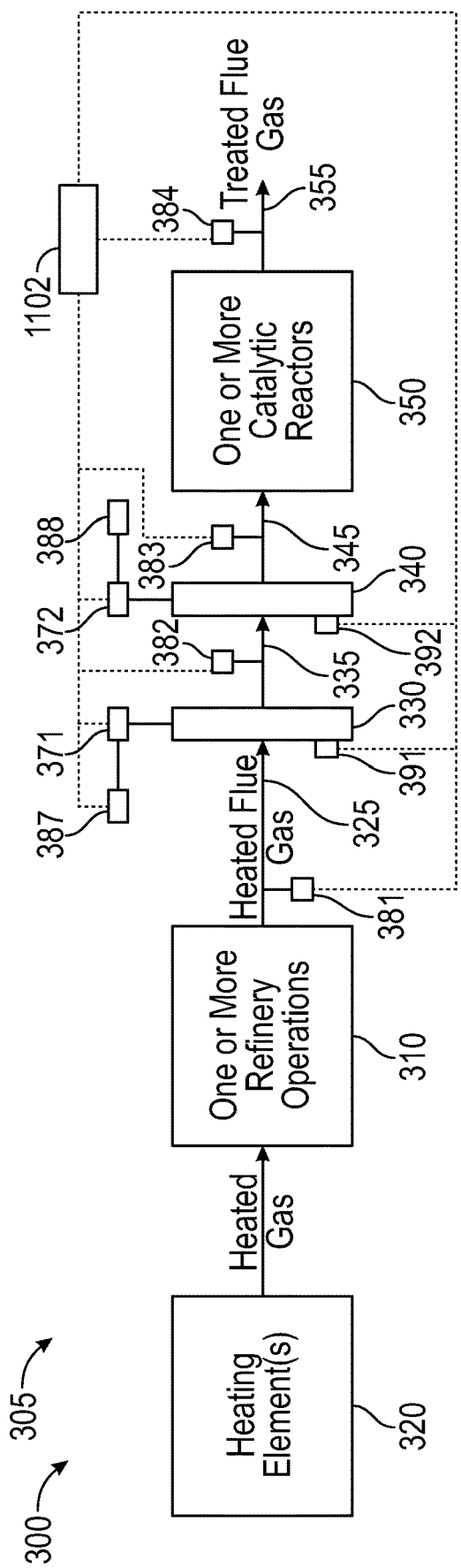
FIG. 3 is a graphical representation of a system and method for reacting a heated fluid stream with a catalytic reactor which may employ one or more flue gas strainer apparatuses having one or more removable mesh portions, according to an exemplary embodiment of the present disclosure.

The present disclosure describes various embodiments related to apparatuses, systems, and methods for mitigating catalyst fouling to allow the process plants or streams to continue to operate smoothly or without the need for shutting down industrial process plants or streams. Further embodiments may be described and disclosed.

In the following description, numerous details are set forth in order to provide a thorough understanding of the various embodiments. In other instances, well-known processes, devices, and systems may not have been described in particular detail in order not to unnecessarily obscure the various embodiments. Additionally, illustrations of the various embodiments may omit certain features or details in order to not obscure the various embodiments.

The description may use the phrases "in some embodiments," "in various embodiments," "in an embodiment," or "in embodiments," which may each refer to one or more of the same or different embodiments. Furthermore, the terms "comprising," "including," "having," and the like, as used with respect to embodiments of the present disclosure, are synonymous.

The term "about" or "approximately" are defined as being close to as understood by one of ordinary skill in the art. In one non-limiting embodiment, the terms are defined to be within 10%, preferably within 5%, more preferably within 1%, and most preferably within 0.5%.

The terms "reducing," "reduced," or any variation thereof, when used in the claims and/or the specification includes any measurable decrease or complete inhibition to achieve a desired result.

The use of the words "a" or "an" when used in conjunction with any of the terms "comprising," "including," "containing," or "having," in the claims or the specification may mean "one," but it is also consistent with the meaning of "one or more," "at least one," and "one or more than one."

The terms "wt. %", "vol. %", or "mol. %" refers to a weight, volume, or molar percentage of a component, respectively, based on the total weight, the total volume of material, or total moles, that includes the component. In a non-limiting example, 10 grams of component in 100 grams of the material is 10 wt. % of component.

The words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps.

Disclosed herein are apparatuses, systems, devices, and methods for removing solid particulates from a fluid stream upstream of a catalyst or other sensitive equipment, in order to reduce or prevent fouling of the catalyst and other downstream equipment. The presently disclosed apparatuses, systems, devices, and methods are particularly useful for removing heating element-derived fiber and dust particles from heated fluid streams, without necessitating the cessation of industrial operations for cleaning, rehabilitation, or replacement of the catalyst. The presently disclosed systems and methods employ one or more flue gas strainer apparatuses capable of reducing catalyst fouling by removing solid particulates from a heated fluid stream and operable to be cleaned or serviced without ceasing or disrupting heating or catalytic operations, thereby mitigating the need for costly process or system downtime.

FIG. 1 is a graphical representation of a system 100 and method 105 for reacting a heated fluid stream with a catalytic reactor, according to an exemplary embodiment of the present disclosure. As depicted in FIG. 1, system 100 may include a fluid stream (e.g., flue gas stream) 115 that may be generated by an industrial process, including but not limited to, one or more refinery operations 110. Flue gas stream 115 may be heated by one or more heating elements 120 operable to heat a fluid stream to produce as heated fluid stream, such as heated flue gas stream 125, as depicted in FIG. 1. System 100 also includes one or more flue gas strainer apparatuses 130, 140 positioned in the flowpath between the heated fluid stream 125 and one or more catalytic reactors 150. The one or more catalytic reactors 150 may contain a catalyst or catalyst bed operable to react with one or more components in the heated fluid stream 125 to produce a treated fluid stream 155. In some embodiments, the one or more catalytic reactors 150 employed in system 100 and method 105 may be part of a fluid catalytic cracking (FCC) unit.

Flue gas strainer apparatuses 130, 140 may be operable to receive the heated fluid stream 125 produced by heating element 120 and capture solid particulates suspended in the heated fluid stream 125 on one or more removable mesh portions of the flue gas strainer apparatus 130, 140. Once solid particulates are captured on the removable mesh portion of flue gas strainer apparatuses 130, 140, the removable mesh portion may be retracted out of the flowpath of the heated fluid stream in order to be cleaned or serviced so as to not foul the performance of the flue gas strainer. The one or more removable mesh portions of flue gas strainer apparatuses 130, 140 may be removed from the flowpath of the heated fluid stream any number of times without causing a stoppage of heating or catalytic operations in system 100.

Exemplary embodiments of flue gas strainer apparatuses 130, 140 are provided in FIGS. 4-10.

Figure 4:
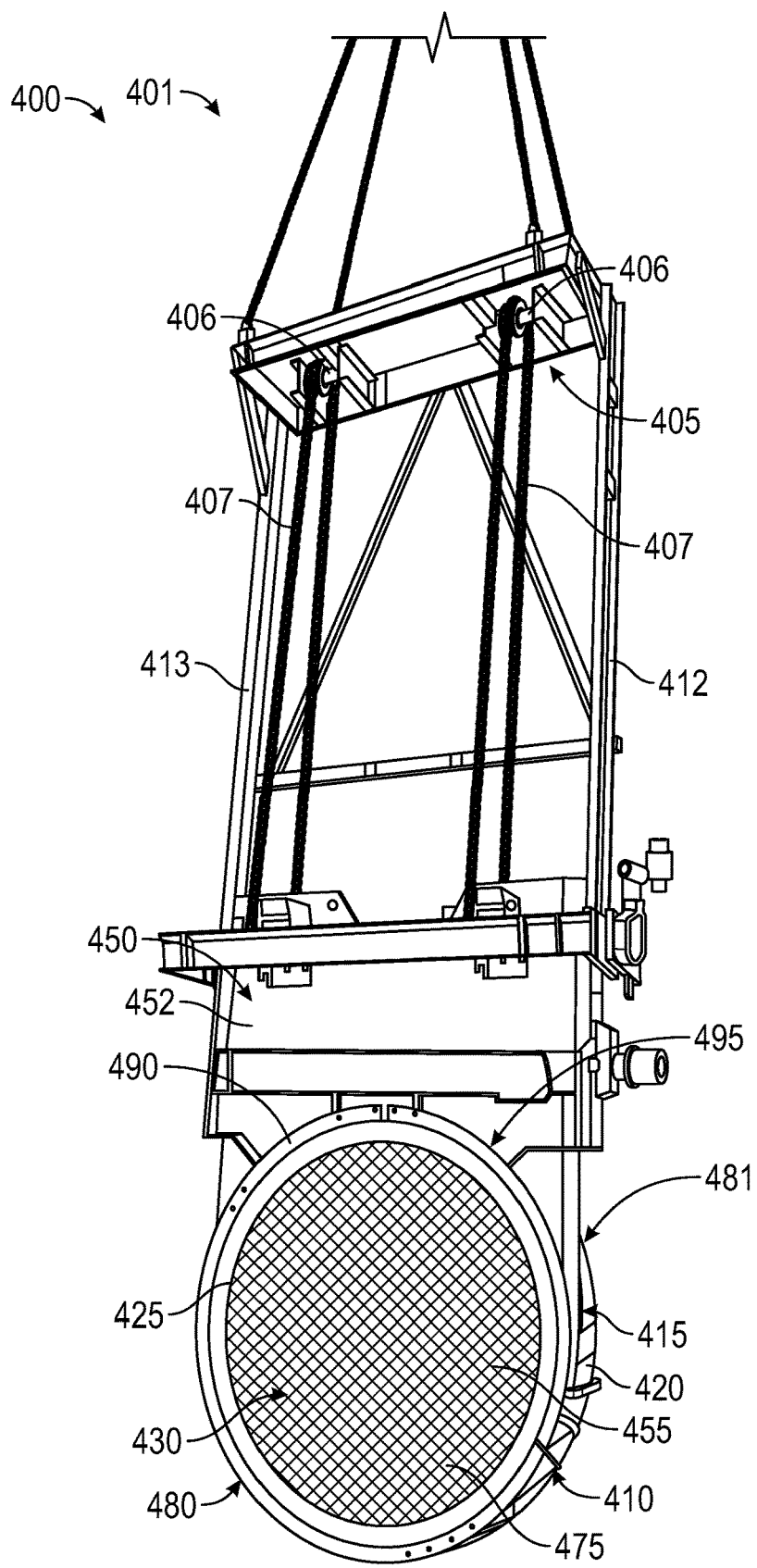
FIG. 4 is a schematic representation of a flue gas strainer apparatus for removing solid particulates from a heated fluid stream upstream of a catalyst, shown in a first received configuration, according to an exemplary embodiment of the present disclosure.

Flue gas strainer apparatus 400 depicted in FIG. 4 is one of many embodiments of flue gas strainer apparatus that may be employed as flue gas strainer apparatuses 130, 140 in system 100. Other embodiments of flue gas strainer apparatuses are within the spirit and scope of the present disclosure. As shown in FIG. 4, flue gas strainer apparatus 400 may include a housing 410 having a front end 480 and a back end 481. Housing 410 may also have an outer edge 420, an inner edge 425, a receiving portion 415, and an inner bore 430 extending from the front end 480 to the back end 481 of the housing along the inner edge 425. The inner edge 425 of flue gas strainer apparatus 400 may define the inner bore 430 which is operable to allow a heated fluid stream to pass therethrough. Flue gas strainer apparatus 400 also includes a moveable strainer portion 450 that comprises one or more removable mesh portions 455. The one or more removable mesh portions 455 has a plurality of pores 475 and is configured to capture solid particulates suspended in the heated fluid stream.

The flue gas strainer apparatus 400 is configured to be positioned in a heated fluid stream such that the outer edge 420 of housing 410 sealingly engages a duct containing the heated fluid stream. In at least some aspects, the flue gas strainer apparatus 400 may include one or more sealing elements 495 coupled with the outer edge 420 of the housing. The one or more sealing elements 495 may be operable to sealingly engage a conduit or duct containing the heated flue stream or heated flue gas stream. In at least some instances, the one or more sealing elements 495 may include one or more flanges 490 coupled to the outer edge 420 of the housing 410 and operable to sealingly engage the duct containing the heated fluid stream. In addition to flanges 490, other means or mechanisms for the outer edge 420 to sealingly engage the ducting containing the heated fluid stream are within the spirit and scope of the present disclosure.

The moveable strainer portion 450 of flue gas strainer apparatus 400 is operable to retract or otherwise be removed from the heated fluid stream such that the one or more removable mesh portions 455 may be cleaned to remove solid particulates captured on the mesh without disrupting the heated fluid stream flowing through the inner bore 430 of housing 410 or disrupting industrial operations that rely on the flow of the heated fluid stream. Accordingly, the moveable strainer portion 450 and/or the one or more removable mesh portions 455 are operable to be removingly received in the receiving portion 415 of the housing 410 such that, in a first received configuration 401 depicted in FIG. 4, the one or more removable mesh portions of moveable strainer portion 450 are operable to capture solid particulates suspended in the heated fluid stream passing through the inner bore 430 of the housing 410.

Figure 6:
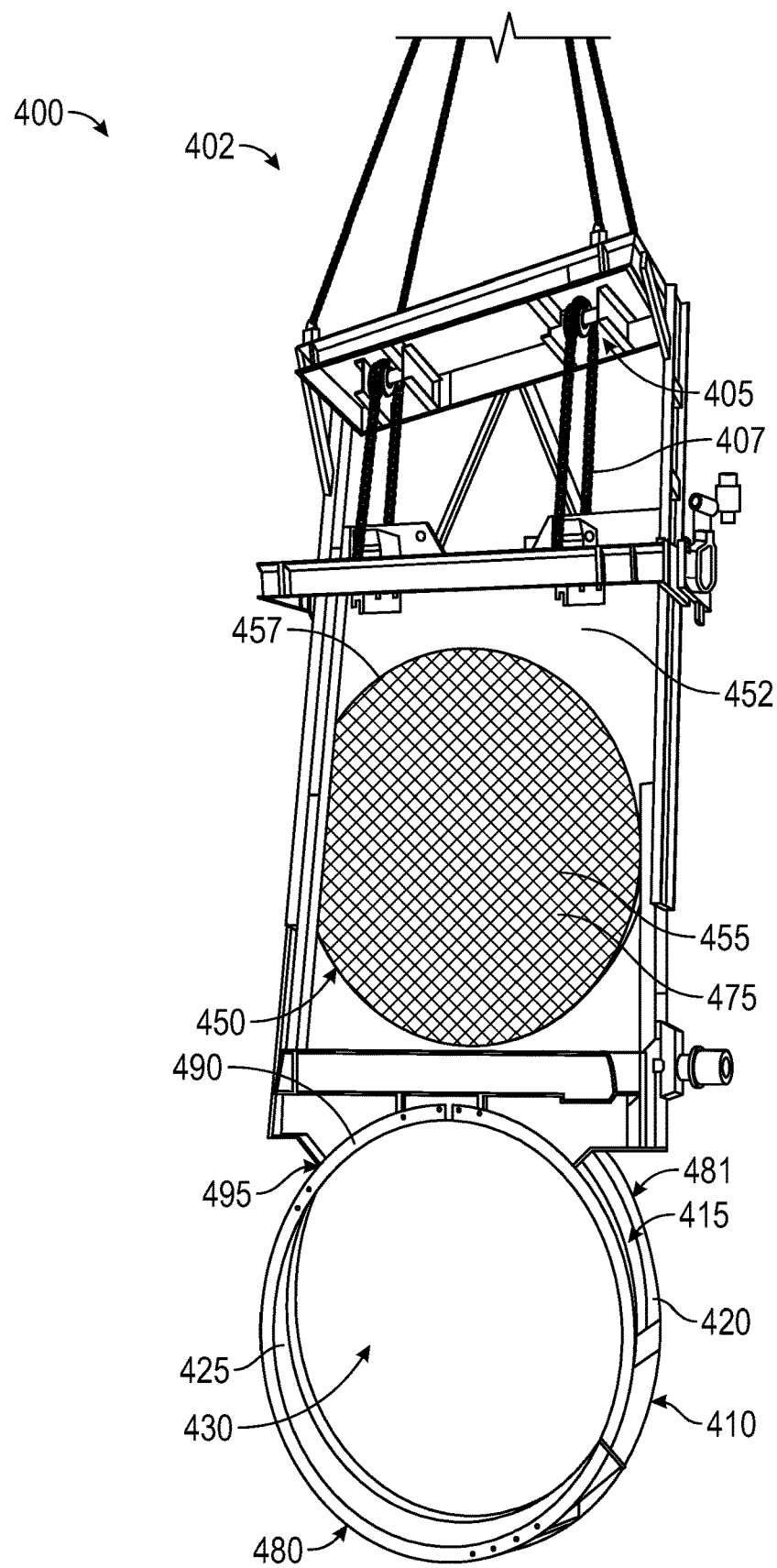
FIG. 6 is a schematic representation of a flue gas strainer apparatus for removing solid particulates from a heated fluid stream upstream of a catalyst, shown in a second retracted configuration, according to an exemplary embodiment of the present disclosure.

Once the one or more removable mesh portions 455 of moveable strainer portion 450 has captured solid particulates from the heated fluid stream on the mesh portion 455, the moveable strainer portion 450 and/or the one or more removable mesh portions 455 may be retracted from the inner bore 430 of housing 410 by deploying the flue gas strainer apparatus 400 to the second retracted configuration 402 shown in FIG. 6. In the second retracted configuration 402, the one or more removable mesh portions 455 is outside the inner bore 430 of the housing 410 and is operable to be cleaned of captured solid particulates while the heated fluid stream continues to flow through the inner bore 430 of the housing 410.

Figure 5:
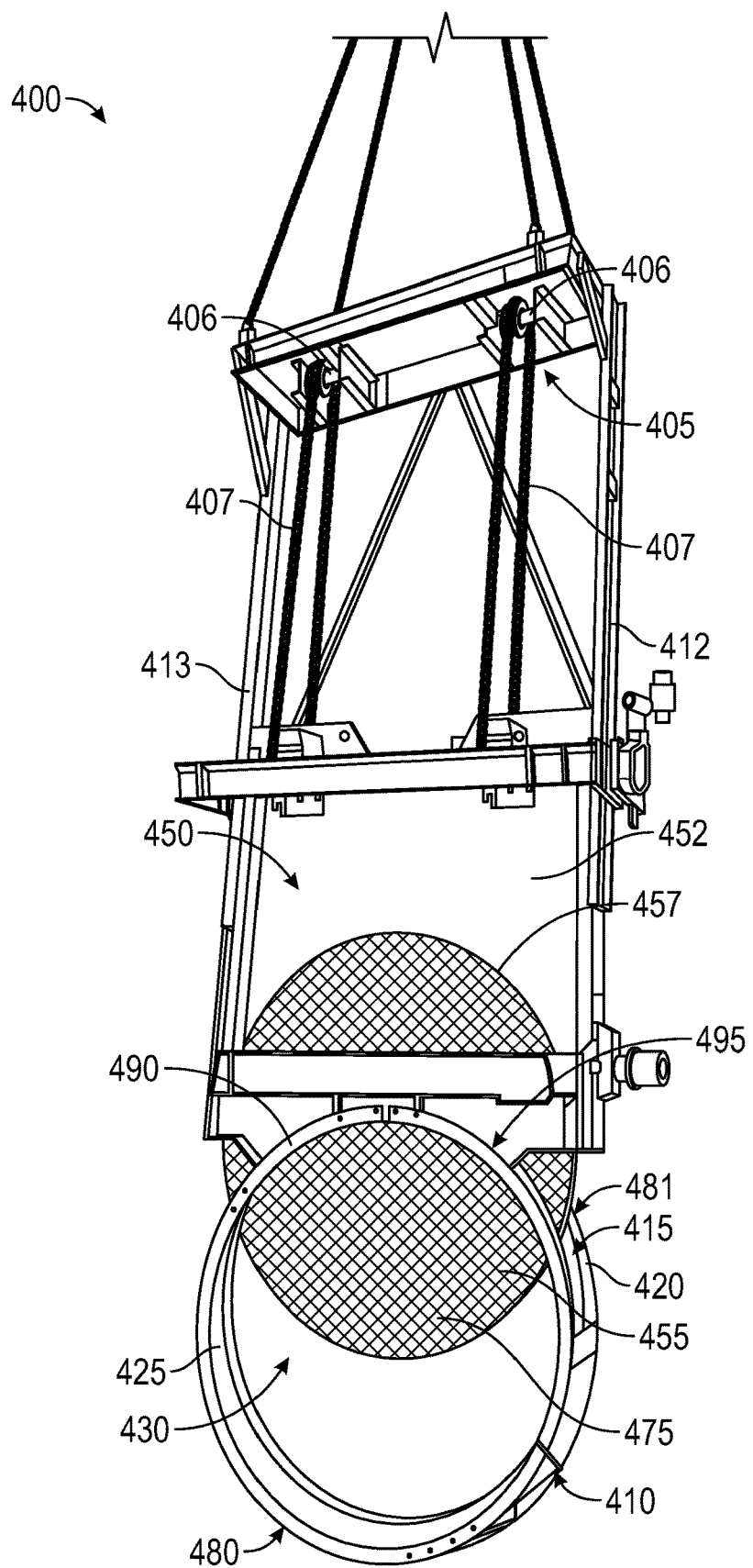
FIG. 5 is a schematic representation of a flue gas strainer apparatus for removing solid particulates from a heated fluid stream upstream of a catalyst, shown in a partially retracted configuration, according to an exemplary embodiment of the present disclosure.

FIG. 5 depicts flue gas strainer apparatus 400 in a partially retracted position. As shown in FIG. 5, moveable strainer portion 450 and/or the one or more removable mesh portions 455 may be received in the receiving portion 415 of the housing 410 disposed between a front end 480 and a back end 481 of the housing 410. In some instances, receiving portion 415 may be a slot in the housing disposed between the front end 480 and back end 481 of the housing 410. The flue gas strainer apparatus 400 may also include one or more sealing elements operable to form a seal around the moveable strainer portion 450 and/or the one or more removable mesh portions 455 once received in the receiving portion 415.

As shown in FIG. 5, flue gas strainer apparatus 400 may include a means 405 for moving the moveable strainer portion 450 comprising the one or more removable mesh portions 455. The means for moving 405 the movable strainer portion 450 may be operable to move the strainer portion 450 such that the one or more removable mesh portions 455 disposed about the moveable strainer portion 450 may be retracted from the receiving portion 415 such that the one or more mesh portions 455 or a respective one of the one or more removable mesh portions of the moveable strainer portion 450 is removed from the inner bore 430 of the housing 410 to a position outside the inner bore 430 of the housing 410. The means for moving 405 the movable strainer portion 450 may also be operable to move the strainer portion 450 such that the one or more removable mesh portions 455 disposed about the moveable strainer portion 450 may be inserted into the receiving portion 415 such that the one or more mesh portions 455 or a respective one of the one or more removable mesh portions of the moveable strainer portion 450 is received in the inner bore 430 of the housing 410 after being inserted from a position outside the inner bore 430 of the housing 410. In some instances, the means for moving 405 the moveable strainer portion 450 may include a motor 406 coupled to one or more tethers 407 that are in turn coupled to the moveable strainer portion 450. The moveable strainer portion 450 may also include a support frame 452 coupling the one or more removable mesh portions 455 to the means for moving the moveable strainer portion 405. In at least some instances, the support frame 452 may be coupled to one or more edges of the one or more removable mesh portions 455, such as edge 457 shown in FIGS. 5 and 6. The support frame 452 may be operable to provide rigid support to the one or more removable mesh portions 455 as well as a means for coupling the one or more removable mesh portion 455 to one or more tethers 407. The support frame 452 may also be operable to engage one or more guide rails 412, 413 operable to slidingly receive the support frame 452 and/or moveable strainer portion 450. The one or more guide rails 412, 413 may be operable to support and guide the moveable strainer portion 450 and/or the one or more removable mesh portions 455 during retraction from or insertion into the receiving portion 415 of housing 410. While FIGS. 4-6 depict flue gas strainer apparatus 400 as having a cylindrical or circular geometry suited for positioning in cylindrical flue gas ducting or conduit, flue gas strainer apparatus 400 can have any geometry. In particular, flue gas strainer apparatus 400 may be constructed to have any geometry so that it may be adapted for use in flue gas ducting or conduit having any geometry.

Any number of flue gas strainer apparatuses may be employed in system 100 depicted in FIG. 1. In some instances, a single flue gas strainer apparatus 130 may be used in system 100. In such instances, operation of a single flue gas strainer apparatus 130 in the flowpath of the heated fluid may be sufficient to mitigate the fouling of the catalyst in the downstream catalytic reactor 150 and other downstream equipment according to the operational parameters of system 100. When a single flue gas strainer apparatus 130 is employed in system 100, solid particulates that may be suspended in heated fluid stream 125 will not be captured by flue gas strainer apparatus 130 when flue gas strainer apparatus 130 is being serviced or cleaned in the retracted configuration, such as retracted configuration 402 depicted in FIG. 6. In some instances, a plurality of flue gas strainer apparatuses, or two or more flue gas strainer apparatuses may be employed in system 100, such as flue gas strainer apparatuses 130, 140 depicted in FIG. 1. In such instances, the plurality of flue gas strainer apparatuses, such as first removable flue gas strainer apparatus 130 and second removable flue gas strainer apparatus 140, may be arranged in series such that one of the flue gas strainer apparatuses may be cleaned outside the flowpath of the heated fluid stream while the other flue gas strainer apparatus is operable to capture solid particulates suspended in the heated fluid stream, providing for continuous operation of system 100 without the need to cease operations to clean the one or more removable flue gas strainers 130, 140.

Figure 7:
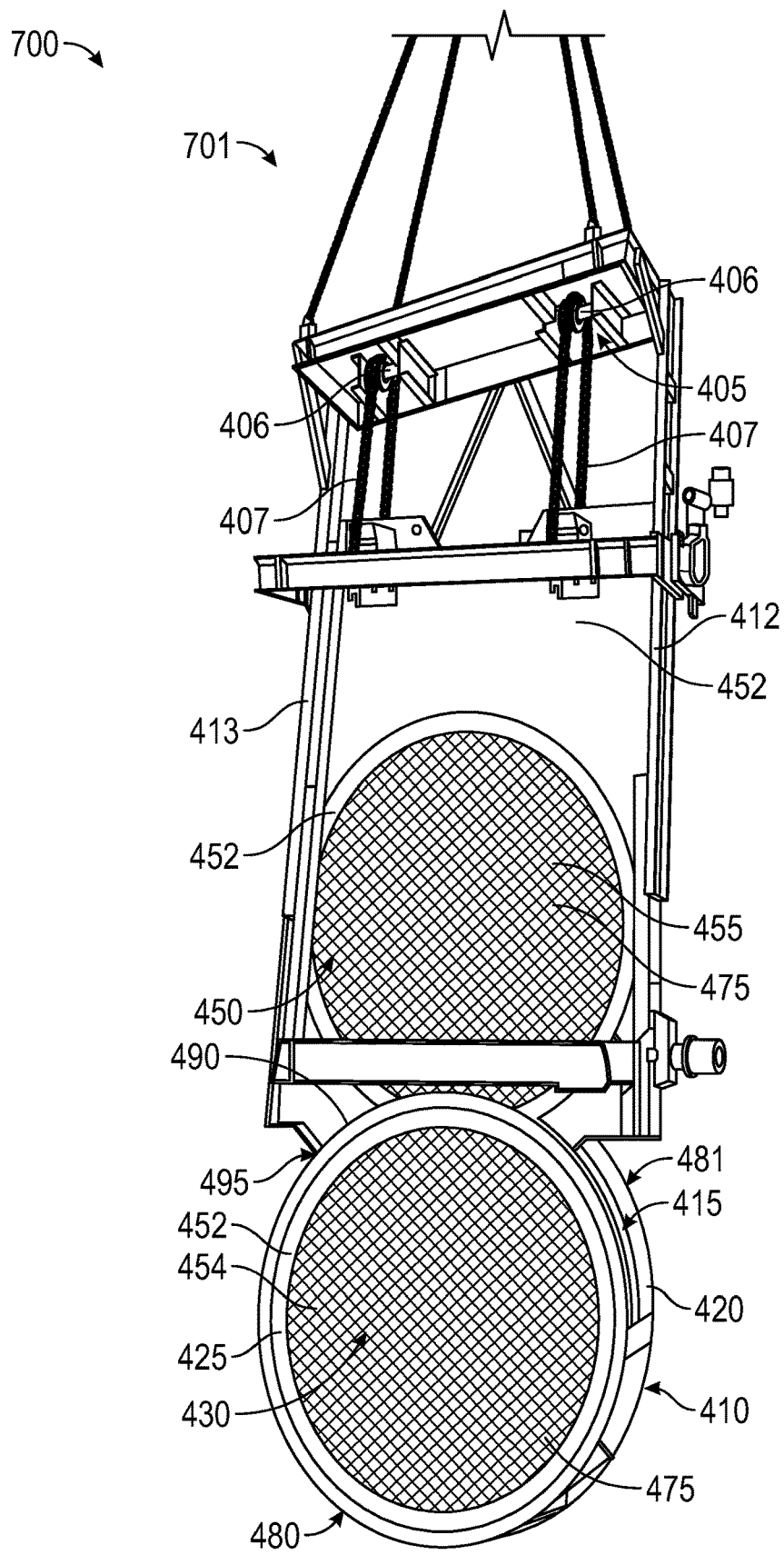
FIG. 7 is a schematic representation of a dual element flue gas strainer apparatus having two removable mesh portions for removing solid particulates from a heated fluid stream, shown in a first configuration with a first removable mesh portion received in the housing and a second removable mesh portion positioned outside the housing, according to an exemplary embodiment of the present disclosure.
Figure 8:
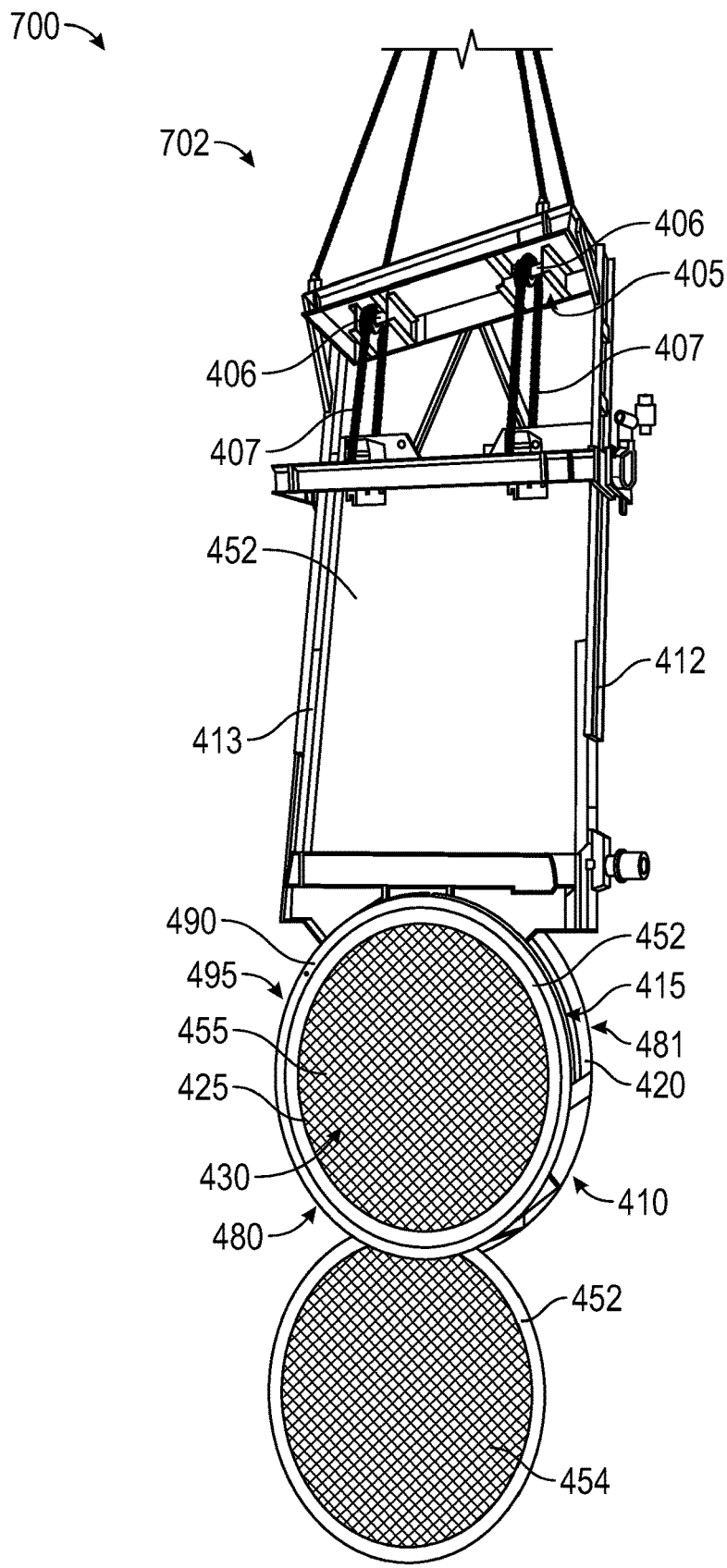
FIG. 8 is a schematic representation of a dual element flue gas strainer apparatus having two removable mesh portions for removing solid particulates from a heated fluid stream, shown in a second configuration with a second removable mesh portion received in the housing and a first removable mesh portion positioned outside the housing, according to an exemplary embodiment of the present disclosure.
Figure 9:
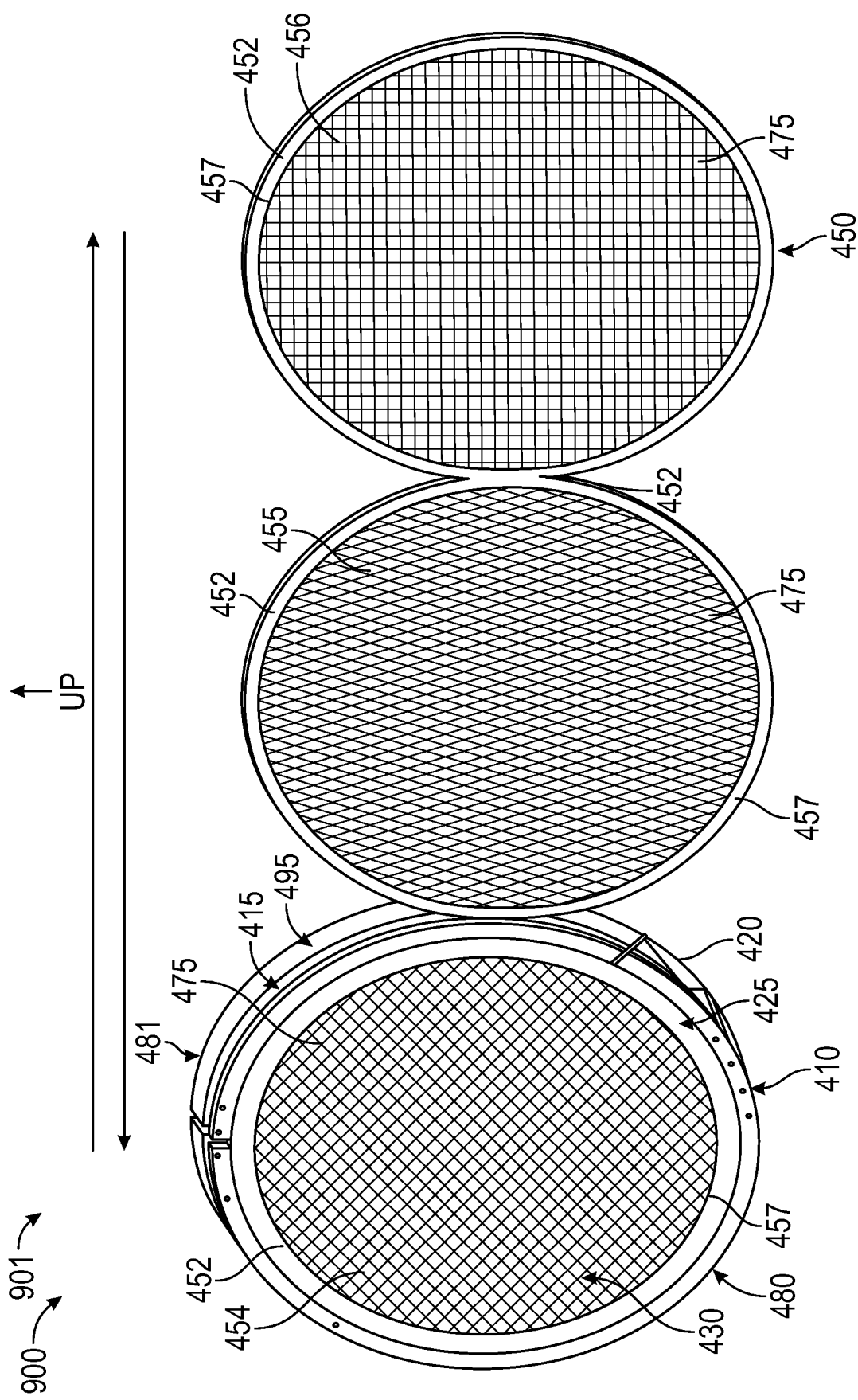
FIG. 9 is a schematic representation of a three element flue gas strainer apparatus having three removable mesh portions for removing solid particulates from a heated fluid stream, shown in a first configuration with a first removable mesh portion received in the housing and a second and third removable mesh portions positioned outside the housing, according to an exemplary embodiment of the present disclosure.
Figure 10:
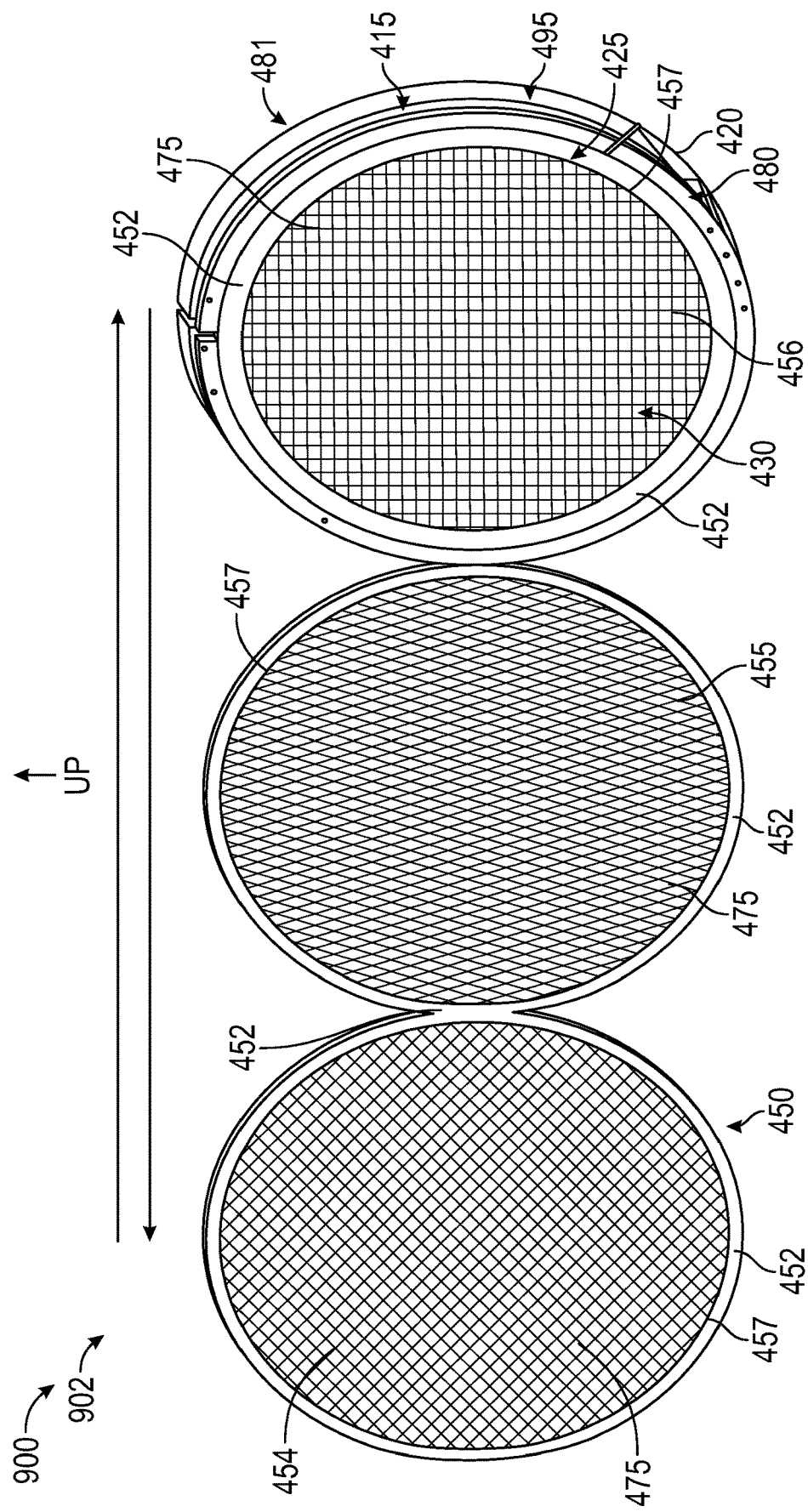
FIG. 10 is a schematic representation of a three element flue gas strainer apparatus having three removable mesh portions for removing solid particulates from a heated fluid stream, shown in a second configuration with a third removable mesh portion received in the housing and first and second removable mesh portions positioned outside the housing, according to an exemplary embodiment of the present disclosure.

In other embodiments, system 100 and method 105 may include flue gas strainer apparatuses 130, 140 having a plurality of removable mesh portions, such as flue gas strainer apparatus 700 shown in FIGS. 7-8 and flue gas strainer apparatus 900 shown in FIGS. 9-10. In such embodiments, one of the plurality of removable mesh portions may be inserted into the heated fluid stream and operable to capture suspended solid particulates while one or more of the other removable mesh portions is simultaneously positioned outside the flowpath of the heated fluid stream and available to be cleaned or serviced. In this manner, the plurality of removable mesh portions on the same flue gas strainer apparatus 130, 140 may be rotated into and out of the flowpath of the heated fluid stream, as needed, without disrupting or ceasing flue gas flow or operations. In particular, system 100 and method 105 may include a means for moving 171, 172 the moveable strainer portions, and the one or more removable mesh portions thereon, of a respective one of flue gas strainer apparatuses 130, 140. The means for moving 171, 172 may be mechanically coupled with the moveable strainer portions of flue gas strainer apparatuses 130, 140 as well as communicatively coupled with controller 1102, as shown in FIG. 1.

In certain embodiments, system 100 and method 105 may further include one or more differential pressure sensors, such as differential pressure sensors 181, 182, 183, 184, operable to measure the pressure at a plurality of positions along the ducting of system 100. In particular, differential pressure sensors 181, 182, 183, 184 may be operable to measure pressure increases or decreases at positions along the ducting of system 100 that may be indicative of the reduced efficiency of one or more flue gas strainer apparatuses 130, 140 due to fouling of flue gas strainer apparatus 130, 140. Therefore, differential pressure sensors 181, 182, 183, 184 may be used by an operator of system 100 or a controller device to determine when one or more removable mesh portions of a flue gas strainer apparatus is fouled and in need of rotation or retraction from the flue gas ducting of system 100. Optionally, system 100 may include one or more optical sensor devices 191, 192 operable to optically inspect and monitor the fouling of the one or more removable mesh portions of a flue gas strainer apparatus 130, 140. As shown in FIG. 1, the differential pressure sensors 181, 182, 183, 184 and optical sensor devices 191, 192 may be communicatively coupled with controller 1102.

In certain embodiments, system 100 and method 105 may further include one or more cleaning devices 187, 188 coupled with flue gas strainer apparatus 130, 140. The one or more cleaning devices 187, 188 may be operable to clean the fouled one or more removable mesh portions by removing the solid particulates that have accumulated on the one or more removable mesh portions of flue gas strainer apparatus 130, 140. As shown in FIG. 1, the one or more cleaning devices 187, 188 may be communicatively coupled with controller 1102.

Method 105 of reacting a heated fluid stream with a catalytic reactor may employ system 100 or portions thereof. In particular, method 105 may include capturing solid particulates suspended in a heated fluid stream on or about one or more flue gas strainer apparatuses, such as flue gas strainer apparatuses 130, 140. The method 105 may also include removing the moveable strainer portion and/or the one or more removable mesh portions from the flowpath of the heated fluid stream without disrupting the flow of the heated fluid stream through the inner bore, and cleaning the retracted one or more removable mesh portions of the moveable strainer portion to substantially remove the captured solid particulates. Method 105 may also include re-inserting the moveable strainer portion and/or the one or more removable strainer portions into the flowpath of the heated fluid stream.

In an alternative embodiment, method 105 may include providing one or more flue gas strainer apparatuses, such as flue gas strainer apparatuses 130, 140, positioned in a flowpath of a heated fluid stream between one or more heating elements 120 and one or more catalytic reactors 150. Method 105 may also include capturing solid particulates suspended in the heated fluid stream on or about the one or more removable mesh portions 455 of the one or more flue gas strainer apparatuses 130, 140. Method 105 may also include removing the moveable strainer portion 450 and/or the one or more removable mesh portions 455 from the flowpath of the heated fluid stream without disrupting the flow of the heated fluid stream through the inner bore 410 of the flue gas strainer apparatus 130, 140. In such instances, method 105 may also include cleaning the one or more removable mesh portions 455 of the moveable strainer portion 450 to substantially remove the captured solid particulates and re-inserting the moveable strainer portion 450 and/or the one or more removable mesh portions 455 into the flowpath of the heated fluid stream.

In cases in which system 100 includes a plurality of flue gas strainer apparatuses 130, 140, method 105 may include deploying the first flue gas strainer apparatus 130 in the first received configuration 401 so as to cause the capture of solid particulates suspended in the heated fluid stream on or about the one or more removable mesh portions 455 of the first flue gas strainer apparatus 130. Method 105 may further include deploying the first flue gas strainer apparatus 130 in the second retracted configuration 402 while the second flue gas strainer apparatus 140 is deployed in the first received configuration 401. Method 105 may further include cleaning the one or more removable mesh portions 455 of the first flue gas strainer apparatus 130 so as to substantially remove the captured solid particulates and capturing solid particulates on or about the one or more removable mesh portions 455 of the second flue gas strainer apparatus 140 substantially contemporaneous with the cleaning of the one or more removable mesh portions 455 of the first flue gas strainer apparatus 130.

Method 105 may also include deploying, after substantial removal of the captured solid particulates from the one or more removable mesh portions 455, the first flue gas strainer apparatus 130 in the first received configuration 401 so as to cause the capture of solid particulates suspended in the heated fluid stream. Method 105 may then include deploying the second flue gas strainer apparatus 140 in the second retracted configuration 402 while the first flue gas strainer apparatus 130 is deployed in the first received configuration 401. Method 105 may then include cleaning the one or more removable mesh portions 455 of the second flue gas strainer apparatus 140 so as to substantially remove the captured solid particulates and capturing solid particulates on or about the one or more removable mesh portions 455 of the first flue gas strainer apparatus 130 substantially contemporaneous with the cleaning of the one or more removable mesh portions 455 of the second flue gas strainer apparatus 140.

Method 105 may also include conducting one or more refinery operations 110 to generate a flue gas stream 115. The method 105 may then include heating the flue gas stream 115 at one or more heating elements 120 to produce a heated flue gas stream 125. Method 105 may further include supplying the heated flue gas stream 125 to a first flue gas strainer apparatus 130 to generate a first strained flue gas stream 135. The method 105 may further include supplying the first strained flue gas stream 135 to a second flue gas strainer apparatus 140 to produce a second strained flue gas stream 145. The second flue gas stream 145 may then be supplied to one or more catalytic reactors 150 containing a catalyst or catalyst bed operable to treat the heated flue gas stream to produce a treated flue gas stream 155.

FIGS. 2 and 3 depict alternative embodiments of the presently disclosed systems and methods. In particular, system 200 and method 205, depicted in FIG. 2, involve a heated flue gas stream 225 that is generated by one or more refinery operations 210 employing one or more heating elements 220. Heated flue gas stream 225 may then be supplied to first flue gas strainer apparatus 230 and second flue gas strainer apparatus 240 to produce first strained flue gas stream 235 and second strained flue gas stream 245 in series. The second strained flue gas stream 245 may be supplied to one or more catalytic reactors 250 to produce treated flue gas stream 255. System 200 and method 205 may optionally further include one or more differential pressure sensors, such as differential pressure sensors 281, 282, 283, 284, operable to measure the pressure at a plurality of positions along the ducting of system 200, as well as optional one or more optical sensor devices 291, 292 operable to optically inspect and monitor the fouling of the one or more removable mesh portions of a flue gas strainer apparatus 230, 240. As shown in FIG. 2, the differential pressure sensors 281, 282, 283, 284 and optical sensor devices 291, 292 may be communicatively coupled with controller 1102. In at least some embodiments, the one or more catalytic reactors 250 employed in system 200 and method 205 may be part of a fluid catalytic cracking (FCC) unit.

System 200 and method 205 may include a means for moving 271, 272 the moveable strainer portions, and the one or more removable mesh portions thereon, of a respective one of flue gas strainer apparatuses 230, 240. The means for moving 271, 272 may be mechanically coupled with the moveable strainer portions of flue gas strainer apparatuses 230, 240 as well as communicatively coupled with controller 1102, as shown in FIG. 2.

In certain embodiments, system 200 and method 205 may further include one or more cleaning devices 287, 288 coupled with flue gas strainer apparatus 230, 240. The one or more cleaning devices 287, 288 may be operable to clean the fouled one or more removable mesh portions by removing the solid particulates that have accumulated on the one or more removable mesh portions of flue gas strainer apparatus 230, 240. As shown in FIG. 2, the one or more cleaning devices 287, 288 may be communicatively coupled with controller 1102.

System 300 and method 305, depicted in FIG. 3, involve the use of one or more heating elements 320 to heat a fluid stream to generate a heated fluid stream 305 that may be supplied to one or more refinery operations 310 resulting in heated flue gas stream 325. Heated flue gas stream 325 that was generated by one or more refinery operations 310 may then be supplied to first flue gas strainer apparatus 330 and second flue gas strainer apparatus 340 to produce first strained flue gas stream 335 and second strained flue gas stream 345 in series. The second strained flue gas stream 345 may be supplied to one or more catalytic reactors 350 to produce treated flue gas stream 355. System 300 and method 305 may optionally further include one or more differential pressure sensors, such as differential pressure sensors 381, 382, 383, 384, operable to measure the pressure at a plurality of positions along the ducting of system 300, as well as optional one or more optical sensor devices 391, 392 operable to optically inspect and monitor the fouling of the one or more removable mesh portions of a flue gas strainer apparatus 330, 340. In at least some embodiments, the one or more catalytic reactors 350 employed in system 300 and method 305 may be part of a fluid catalytic cracking (FCC) unit.

System 300 and method 305 may include a means for moving 371, 372 the moveable strainer portions, and the one or more removable mesh portions thereon, of a respective one of flue gas strainer apparatuses 330, 340. The means for moving 371, 372 may be mechanically coupled with the moveable strainer portions of flue gas strainer apparatuses 330, 340 as well as communicatively coupled with controller 1102, as shown in FIG. 3.

In certain embodiments, system 300 and method 305 may further include one or more cleaning devices 387, 388 coupled with flue gas strainer apparatus 330, 340. The one or more cleaning devices 387, 388 may be operable to clean the fouled one or more removable mesh portions by removing the solid particulates that have accumulated on the one or more removable mesh portions of flue gas strainer apparatus 330, 340. As shown in FIG. 3, the one or more cleaning devices 387, 388 may be communicatively coupled with controller 1102.

The presently disclosed flue gas strainer apparatuses 400, 700, 900, as well as methods 105, 205, 305, and systems 100, 200, 300 employing the flue gas strainer apparatus 400, 700, 900, are operable to prevent or reduce fouling of downstream catalysts and equipment from solid particulates that may be derived from upstream heating elements. In at least some instances, the one or more heating elements may be a refractory heating element or a fiber refractory heating element. In order to provide optimum protection for downstream catalysts the one or more removable mesh portions 455 of the flue gas strainer apparatus 400 may be sized based on the catalyst that it is protecting. In general, removable mesh portions 455 having an average pore size that is smaller than the average pore size of the catalyst are desirable. In certain embodiments, the mesh size of the one or more removable mesh portions, such as mesh portion 455, may be from about 1 mm to about 7 mm, or from about 0.5 mm to about 10 mm, or from about 1 mm to about 5 mm, or from about 2.5 mm to about 5 mm, or from about 3 mm to about 5 mm, or from about 0.5 mm to about 5 mm.

FIG. 7 is a schematic representation of a dual element flue gas strainer apparatus 700 having two removable mesh portions 454, 455 for removing solid particulates from a heated fluid stream. As depicted in FIG. 7, flue gas strainer apparatus 700 is shown in a first configuration 701 with a first removable mesh portion 454 received in the receiving portion 415 of the housing 410 and a second removable mesh portion 455 positioned outside the housing. In FIG. 8, the dual element flue gas strainer apparatus 700 is shown in a second configuration 702 with the second removable mesh portion 455 received in the housing and the first removable mesh portion 454 positioned outside the housing 410 so that it may be cleaned.

FIG. 9 is a schematic representation of a three element flue gas strainer apparatus 900 having three removable mesh portions 454, 455, 456 for removing solid particulates from a heated fluid stream. As shown in FIG. 9, flue gas strainer apparatus 900 is shown in a first configuration 901 with a first removable mesh portion 454 received in the receiving portion 415 of housing 410 and a second 455 and third 456 removable mesh portions positioned outside the housing 410 so that they may be cleaned. In FIG. 10, the three element flue gas strainer apparatus 900 is shown in a second configuration 902 in which the first removable mesh portion 454 and the second removable mesh portion 455 is positioned outside the housing 410 in a cleaning position while the third removable mesh portion 456 is received in the receiving portion 415 of housing 410.

Figure 11:
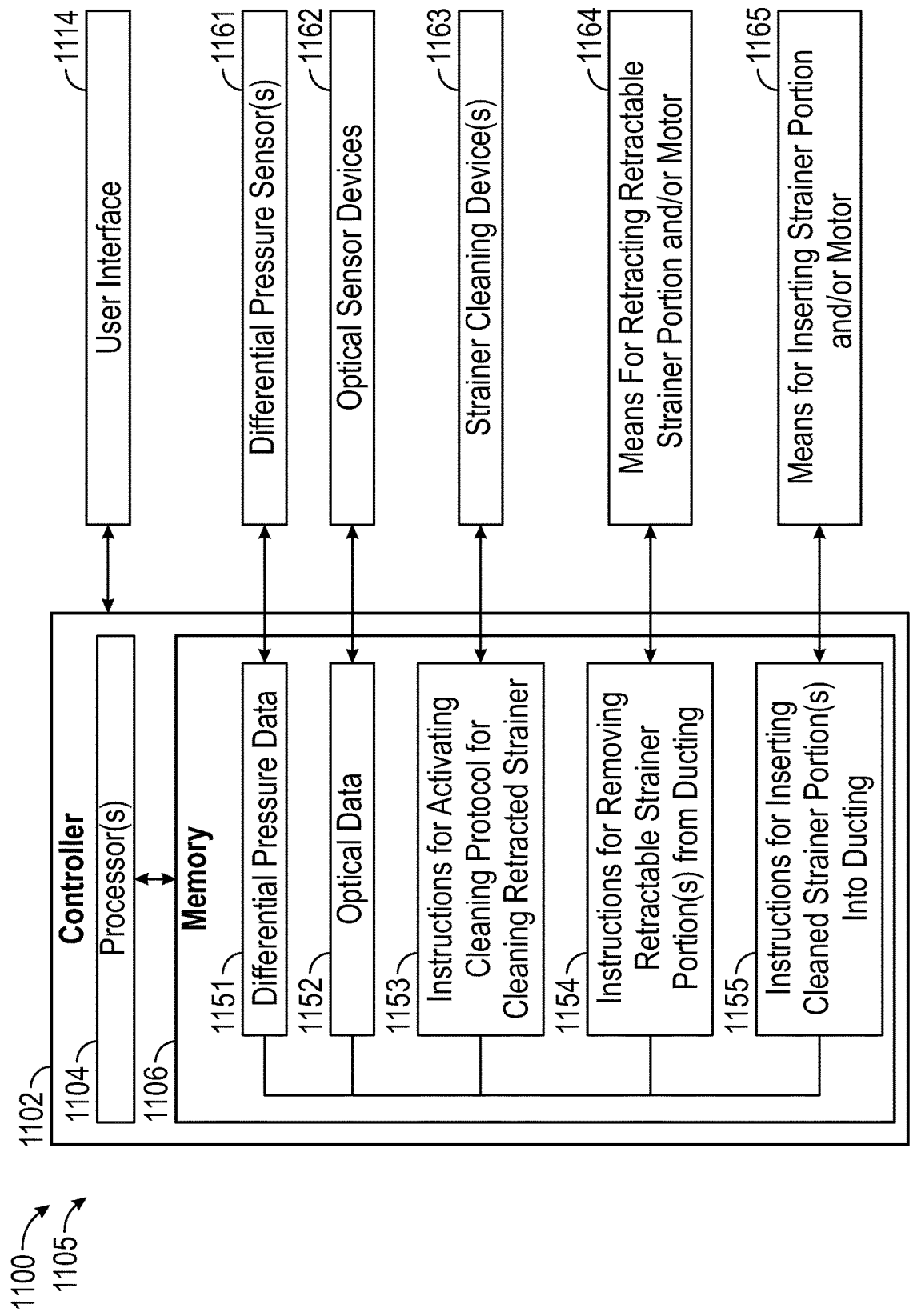
FIG. 11 is a graphical representation of a flue gas strainer insertion/retraction control system and method for inserting and/or retracting one or more removable mesh portions with respect to a flue gas strainer housing or flue gas ducting, according to an exemplary embodiment of the present disclosure.

FIG. 11 is a graphical representation of a flue gas strainer insertion/retraction control system 1100 and method 1105 for inserting and/or retracting one or more removable mesh portions with respect to a flue gas strainer housing or flue gas ducting, according to an exemplary embodiment of the present disclosure. Systems 100, 200, 300, depicted in FIGS. 1-3, may include a controller 1102 that may be implemented as part of flue gas strainer insertion/retraction control system 1100 and method 1105, according to the exemplary embodiments of flue gas strainer insertion/retraction control system 1100 and method 1105 provided in FIG. 11. Insertion/retraction control system 1100 may control the movement of the moveable strainer portion and the insertion and retraction of the one or more removable mesh portions from the receiving portion of the housing of one or more flue gas strainer apparatuses in systems 100, 200, 300. Other embodiments of insertion/retraction control systems are within the spirit and scope of the present disclosure.

As depicted in FIG. 11, insertion/retraction control system 1100 may include a controller 1102. Controller 1102 may comprise one or more controllers, a programmable logic controller (PLC), a supervisory control and data acquisition (SCADA) system, a computing device, and combinations thereof, as well as other components, to manage or control the movement of the moveable strainer portion and/or the insertion and/or the retraction of the one or more removable mesh portions of one or more flue gas strainer apparatuses into and from the flue gas strainer housing or flue gas ducting. Controller 1102 may include one or more processors (e.g., processor 1104) to execute instructions stored in memory 1106. In an exemplary embodiment, the memory 1106 may be a machine-readable storage medium. As used herein, a "machine-readable storage medium" may be any electronic, magnetic, optical, or other physical storage apparatus to contain or store information such as executable instructions, data, and the like. For example, any machine-readable storage medium described herein may be any of random access memory (RAM), volatile memory, non-volatile memory, flash memory, a storage drive (e.g., hard drive), a solid state drive, any type of storage disc, and the like, or a combination thereof. As noted, the memory 1106 may store or include instructions executable by processor 1104. As used herein, a "processor" may include, for example one processor or multiple processors included in a single device or distributed across multiple computing devices. The processor 1104 may be at least one of a central processing unit (CPU), a semiconductor-based microprocessor, a graphics processing unit (GPU), a field-programmable gate array (FPGA) to retrieve and execute instructions, a real time processor (RTP), other electronic circuitry suitable for the retrieval and execution of instructions stored on a machine-readable storage medium, or a combination thereof.

Instructions stored in the memory 1106 and executable by the processor 1104 may include instructions 1154 to remove or retract the movable strainer portion and/or the one or more removable mesh portions from the housing or flue gas ducting by moving or retracting the movable strainer portion. Controller 1102 may control the means 1164 for moving strainer portion and retracting one or more removable mesh portions based on instructions 1154 for removing or retracting one or more removable mesh portions from the housing or flue gas ducting. The means for removing or retracting 1164 may include, for example, a motor 406 coupled to one or more tethers 407 that are in turn coupled to the moveable strainer portion 450 in systems 400, 700 depicted in FIGS. 4-8.

Similarly, memory 1106 may include instructions 1155 for moving the moveable strainer portion of one or more flue gas strainer apparatuses such that one or more removable mesh portions are inserted into the housing of the apparatus or inserted into the flowpath of the flue gas ducting. Controller 1102 may control the means 1165 for moving the strainer portion and thereby causing the insertion of one or more removable mesh portions into the housing or flue gas ducting. The means for removing or retracting 1165 may include, for example, a motor 406 coupled to one or more tethers 407 that are in turn coupled to the moveable strainer portion 450 in systems 400, 700 depicted in FIGS. 4-8. In at least some embodiments, the one or more removable mesh portions that may be inserted by controller 1102 may have been cleaned of solid particulates prior to being inserted. In certain embodiments, memory 1106 may include instructions 1153 for activating a cleaning protocol for cleaning one or more of the retracted removable mesh portions that have been retracted from the housing and/or the flue gas duct. In such embodiments, controller 1102 may control one or more strainer cleaning devices 1163 based on instructions 1153 for activating cleaning protocol or for cleaning retracted strainer. For example, one or more strainer cleaning devices 1163 may be mesh cleaning devices 187, 188 of system 100 depicted in FIG. 1 or mesh cleaning devices 287, 288 in system 200 depicted in FIG. 2 or mesh cleaning devices 387, 388 in system 300 depicted in FIG. 3.

Memory 1106 of controller 1102 may also include differential pressure data 1151 obtained from differential pressure sensors 1161, such as differential pressure sensors 181, 182, 183, 184 in system 100 depicted in FIG. 1, or differential pressure sensors 281, 282, 283, 284 in system 200 depicted in FIG. 2, or differential pressure sensors 381, 382, 383, 384 in system 300 depicted in FIG. 3. In certain embodiments, memory 1106 may also optionally include optical data 1152 obtained from one or more optical sensor devices 1162, such as optical sensor devices 191, 192 in system 100 depicted in FIG. 1, or optical sensor devices 291, 292 in system 200 depicted in FIG. 2, or optical sensor devices 391, 392 in system 300 depicted in FIG. 3. In certain embodiments, controller 1102 may determine when one or more of removable mesh portions are fouled by captured solid particulates based on data 1151, 1152 obtained from differential pressure sensors 1161 and/or optical sensor devices 1162. Insertion/retraction control system 1100 may also include a user interface 1114 operable to manually communicate with the controller 1102 to manually control any of the above-described functions of controller 1102 or to manually input data into memory 1106, or to override any of the instructions stored in memory 1106.

Figure 12:
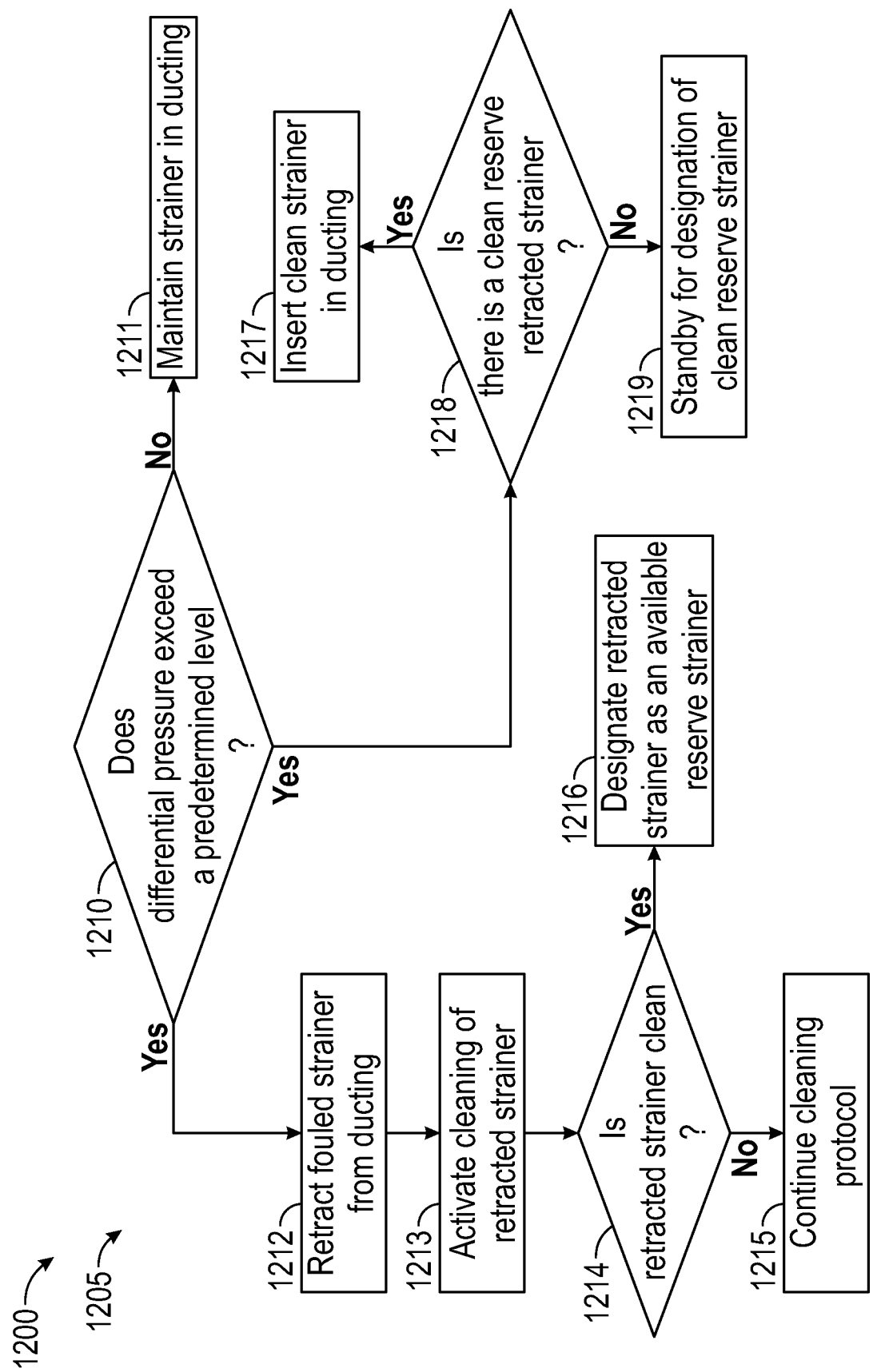
FIG. 12 is a flow diagram of controller operations in a flue gas strainer insertion/retraction control system and method for inserting and/or retracting one or more removable mesh portions with respect to a flue gas strainer housing or flue gas ducting, according to an exemplary embodiment of the present disclosure.

FIG. 12 is a flow diagram of controller operations in a flue gas strainer insertion/retraction control system 1100 and method 1105 for inserting and/or retracting one or more removable mesh portions with respect to a flue gas strainer housing or flue gas ducting, according to an exemplary embodiment of the present disclosure. The flow diagram shown in FIG. 12, depicts a method 1200 and system 1205 for inserting and/or retracting one or more removable mesh portions, such as may be implemented by controller 1102, according to an exemplary embodiment of the present disclosure. Method 1200 and system 1205 is detailed with reference to the controller 1102 and injection control system 1100 of FIG. 11. Unless otherwise specified, the actions of method 1200 may be completed, in an exemplary embodiment, within the controller 1102, but may also be implemented in other systems and/or computing devices as will be understood by those skilled in the art. Specifically, method 1200 may be included in one or more programs, protocols, or instructions loaded into the memory 1106 of the controller 1102 and executed on the processor 1104 or one or more processors of the controller 1102. The order in which the operations are described is not intended to be construed as a limitation, and any number of the described blocks may be combined in any order and/or in parallel to implement the method 1200.

At block 1210, controller 1102 may determine whether a change in the differential pressure in the system, such as systems 100, 200, 300 depicted in FIGS. 1-3, exceeds a predetermined level. In some embodiments, the controller 1102 may alternatively determine at block 1210 whether the pressure or differential pressure measured at one or more pressure sensors exceeds a predetermined level. In certain other embodiments, the controller 1102 may alternatively determine at block 1210 whether the pressure or differential pressure measured at one or more pressure sensors falls below a certain pressure level. Such a determination by controller 1102 may be made based on, for example, data received from differential pressure sensors 181, 182, 183, 184 of system 100 depicted in FIG. 1 or differential pressure sensors 281, 282, 283, 284 of system 200 depicted in FIG. 2, or differential pressure sensors 381, 382, 383, 384 of system 300 depicted in FIG. 3. If the controller 1102 determines at block 1210 that the measured pressure or change in differential pressure exceeds or falls below a predetermined level, the controller 1102 may retract one or more fouled strainers or meshes from the ducting at block 1212. Controller 1102 may also activate at block 1213 one or more cleaning protocols or cleaning devices to clean the accumulated solid particulates from the retracted one or more removable mesh portions. For example, controller 1102 may activate at block 1213 one or more of cleaning devices 187, 188 in system 100 depicted in FIG. 1, or cleaning devices 287, 288 in system 200 depicted in FIG. 2, or cleaning devices 387, 388 in system 300 depicted in FIG. 3.

At block 1214, controller 1102 may determine whether the retracted mesh portion or moveable strainer portion is clean. If the controller 1102 determines at block 1214 that the retracted mesh portion or moveable strainer portion is clean, controller 1102 may designated at block 1216 the retracted mesh portion or moveable strainer portion as an available reserve mesh portion or moveable strainer portion that may be re-inserted into the housing or into the flue gas ducting. If the controller 1102 determines at block 1214 that the retracted mesh portion or moveable strainer portion is not clean, then controller 1102 may at block 1215 instruct the cleaning devices to continue the cleaning protocol until the controller determines that the retracted moveable strainer portion or mesh portion is substantially clean of accumulated solid particulates.

If the controller 1102 determines at block 1210 that the measured pressure or change in pressure exceeds or falls below a predetermined level, the controller may also determine at block 1218 whether there is a clean reserve retracted mesh portion or moveable strainer portion. If the controller 1102 determines at block 1218 that there is clean retracted reserve mesh portion or moveable strainer portion, the controller 1102 may at block 1217 instruct the means of moving the moveable strainer portion to move such that a clean mesh portion is inserted into the housing or flue gas ducting. If the controller 1102 determines at block 1218 that there is not a clean retracted reserve mesh portion or moveable strainer portion available, the controller 1102 will at block 1219 standby for the designation of an available clean reserve strainer, such as by designation at block 1216. If at block 1210, the controller 1102 determines that the measured pressure or differential pressure does not exceed or fall below a predetermined level, the controller at block 1211 will maintain the removable mesh portion and/or the moveable strainer portion in the housing or flue gas ducting.

As used herein, the term "transmits a signal," or reference to other signal communications, in all their forms, refers to electric communication such as hard wiring two components together or wireless communication, as understood by those skilled in the art. For example, wireless communication may be Wi-Fi®, Bluetooth®, ZigBee, forms of near field communications, or other wireless communication methods as will be understood by those skilled in the art. In addition, "transmits a signal" and other signal communications may involve or include one or more intermediate controllers, relays, or switches disposed between elements that are in signal communication with one another.

When ranges are disclosed herein, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, reference to values stated in ranges includes each and every value within that range, even though not explicitly recited. Thus, every point or individual value may serve as its own lower or upper limit combined with any other point or individual value or any other lower or upper limit, to recite a range not explicitly recited.

This application claims priority to, and the benefit of, U.S. Provisional Application No. 63/386,586, filed Dec. 8, 2022, titled "Removable Flue Gas Strainer and Associated Methods," the disclosure of which is incorporated herein by reference in its entirety.

Other objects, features and advantages of the disclosure will become apparent from the foregoing figures, detailed description, and examples. It should be understood, however, that the figures, detailed description, and examples, while indicating specific embodiments of the disclosure, are given by way of illustration only and are not meant to be limiting. In further embodiments, features from specific embodiments may be combined with features from other embodiments. For example, features from one embodiment may be combined with features from any of the other embodiments. In further embodiments, additional features may be added to the specific embodiments described herein.

What is claimed is:

1. A flue gas strainer apparatus to filter heated flue gas flowing from a heating element to a fluid catalytic cracking unit, the flue gas strainer apparatus comprising:
   a housing positioned in a flowpath of a heated flue gas stream between a heating element and a fluid catalytic cracking unit, the housing having a front end and a back end, the housing comprising a receiving portion, an outer edge, an inner edge, and an inner bore extending from the front end to the back end of the housing along the inner edge, the inner bore positioned to allow the heated flue gas stream to pass therethrough;
   a moveable strainer portion comprising one or more removable mesh portions having a plurality of pores and configured to capture solid particulates suspended in the heated flue gas stream, the one or more removable mesh portions operable to be removingly received in the receiving portion of the housing such that:
      in a first received configuration, the one or more removable mesh portions is operable to capture solid particulates suspended in the heated flue gas stream passing through the inner bore of the housing, and
      in a second retracted configuration, the one or more removable mesh portions is operable to be retracted such that the one or more removable mesh portions is outside the inner bore of the housing and operable to be cleaned of captured solid particulates while the heated flue gas stream continues to flow through the inner bore of the housing;
   one or more sealing elements connected to the outer edge of the housing and operable to sealingly engage a duct, thereby to enable the heated flue gas when flowing through the duct to be filtered for a downstream fluid catalytic cracking unit and prevent the heated flue gas from escaping the duct and the housing at a point of engagement between the duct and housing;
   a first sensor positioned downstream of the moveable strainer portion and configured to measure a first characteristic;
   a second sensor positioned upstream of the moveable strainer portion and configured to measure a second characteristic; and
   a controller in signal communication with the first sensor and the second sensor, the controller configured to:
      obtain the first characteristic and the second characteristic, and
      based on the first characteristic and the second characteristic, move one or more of the one or more removable mesh portions from one of (a) the first received configuration to the second retracted configuration or (b) the second retracted configuration to the first received configuration.

2. The flue gas strainer apparatus according to claim 1, wherein the one or more sealing elements comprises one or more flanges operable to sealingly engage the duct containing the heated flue gas stream.

3. The flue gas strainer apparatus according to claim 2, further comprising a motor coupled with the moveable strainer portion configured to (a) retract the moveable strainer portion from the receiving portion such that the one or more removable mesh portions of the moveable strainer portion is removed from the inner bore of the housing to a position outside the inner bore of the housing, and (b) advance the moveable strainer portion such that the one or more removable mesh portions of the moveable strainer portion is inserted into the inner bore of the housing from a position outside the inner bore of the housing.

4. The flue gas strainer apparatus according to claim 3, wherein the motor connects to the moveable strainer portion by one or more of: (a) one or more tethers or (b) a pulley apparatus.

5. The flue gas strainer apparatus according to claim 4, wherein the moveable strainer portion comprises a support frame connecting the one or more removable mesh portions to the motor.

6. The flue gas strainer apparatus according to claim 5, wherein the support frame is connected to one or more edges of the one or more mesh portions.

7. The flue gas strainer apparatus according to claim 5, wherein the moveable strainer portion further comprises a plurality of removable mesh portions.

8. The flue gas strainer apparatus according to claim 7, wherein the plurality of removable mesh portions is connected to the support frame, the removable mesh portions are positioned spaced-apart on the support frame or on the moveable strainer portion, such that when at least one mesh portion is inserted into the inner bore of the housing, at least one other mesh portion is positioned outside the inner bore of the housing.

9. The flue gas strainer apparatus according to claim 8, wherein the motor is configured to cycle the plurality of removable mesh portions into and out of the inner bore of the housing such that when a fouled mesh portion comprising captured particles is removed from the inner bore of the housing, a clean mesh portion is inserted into the inner bore of the same housing by the same motion of the moveable strainer portion.

10. The flue gas strainer apparatus according to claim 1, wherein the receiving portion comprises a slot in the housing disposed between the front end and the back end of the housing.

11. The flue gas strainer apparatus according to claim 10, further comprising one or more guide rails operable to slidingly receive the moveable strainer portion, or a portion thereof, the one or more guide rails operable to support and guide the moveable strainer portion during retraction or insertion.

12. The flue gas strainer apparatus according to claim 1, wherein the first sensor and the second senor each comprises a pressure sensor to measure pressure of the heated flue gas stream, wherein the first characteristic is a downstream pressure of the heated flue gas stream and the second characteristic is an upstream pressure of the heated flue gas stream, wherein the controller is further configured to determine a pressure differential of the downstream pressure and the upstream pressure, and wherein movement of one or more of the one or more removable mesh portions is based on the pressure differential.

13. The flue gas strainer apparatus according to claim 1, wherein first sensor and the second senor each comprises an optical sensor device, and wherein the first characteristic and the second characteristic comprises a level of fouling of the one or more removable mesh portions.

14. A flue gas strainer apparatus to filter heated flue gas flowing from a heating element to a fluid catalytic cracking unit, the flue gas strainer apparatus comprising:
  a housing positioned in a flowpath of a heated flue gas stream between a heating element and a fluid catalytic cracking unit, the housing having a front end and a back end, the housing comprising two or more receiving portions, an outer edge, an inner edge, and an inner bore extending from the front end to the back end of the housing along the inner edge, the inner bore positioned to allow the heated flue gas stream to pass therethrough, and the outer edge configured to sealingly engage a duct, thereby to prevent portions of the heated flue gas from escaping the housing and the duct when flowing through the inner bore;
  two or more moveable strainer portions each comprising a mesh portion having a plurality of pores and configured to capture solid particulates suspended in the heated flue gas stream when flowing through the inner bore, the mesh portion operable to be removingly received in a corresponding one of the two or more receiving portions of the housing such that:
    in a first configuration, the mesh portion resides within the inner bore of the housing and captures solid particulates suspended in the heated flue gas stream passing therethrough, and
    in a second configuration, the mesh portion resides external to the housing;
  a first sensor positioned downstream of the two or more moveable strainer portions and configured to measure a first characteristic;
  a second sensor positioned upstream of the two or more moveable strainer portions and configured to measure a second characteristic; and
  a controller in signal communication with the first sensor and the second sensor, the controller configured to:
    obtain the first characteristic and the second characteristic, and
    based on the first characteristic and the second characteristic, move one or more of the two or more moveable strainer portions from one of (a) the first configuration to the second configuration or (b) the second configuration to the first configuration.

15. The flue gas strainer apparatus according to claim 14, wherein the controller is further configured to, when a first of the two or more moveable strainer portions is moved from the first configuration to the second configuration, move a second of the two or more moveable strainer portions from the second configuration to the first configuration.

16. The flue gas strainer apparatus according to claim 14, wherein a position of each of the two or more moveable strainer portions comprises a series format in relation to each other of the two or more moveable strainer portions.

17. The flue gas strainer apparatus according to claim 14, wherein the two or more moveable strainer portions comprise two moveable strainer portions, and further comprising a third sensor positioned between a first of the two moveable strainer portions and a second of the two moveable strainer portions and configured to measure a third characteristic.

18. A system to filter heated flue gas flowing from a heating element to a fluid catalytic cracking unit, the system comprising:
  two or more flue gas apparatuses engaged with a duct in series, each of the two or more flue gas apparatuses comprising:
    a housing positioned in a flowpath of a heated flue gas stream between a heating element and a fluid catalytic cracking unit, the housing having a front end and a back end, the housing comprising a receiving portion, an outer edge, an inner edge, and an inner bore extending from the front end to the back end of the housing along the inner edge, the inner bore positioned to allow the heated flue gas stream to pass therethrough;
    a moveable strainer portion comprising one or more mesh portions having a plurality of pores and configured to capture solid particulates suspended in the heated flue gas stream, the one or more mesh portions operable to be removingly received in the receiving portion of the housing such that:
      in a first configuration, one or more of the one or more mesh portions reside within the inner bore of the housing and captures solid particulates suspended in the heated flue gas stream passing therethrough, and
      in a second configuration, one or more of the one or more mesh portions reside external to the housing;
    a first pressure sensor positioned downstream of the moveable strainer portion and configured to measure a downstream pressure of the heated flue gas stream when flowing through the inner bore;
    a second pressure sensor positioned upstream of the moveable strainer portion and configured to measure an upstream pressure of the heated flue gas stream when flowing through the inner bore;
    an optical sensor connected to the housing and operable to optically inspect and monitor fouling of the one or more mesh portions; and
  a controller in signal communication with the first pressure sensor, the second pressure sensor, and the optical sensor of each of the two or more flue gas apparatuses, the controller configured to:
    obtain the downstream pressure and the upstream pressure for each of the two or more flue gas apparatuses,
    determine a pressure differential for each of the two or more flue gas apparatuses based on a respective downstream pressure and a respective upstream pressure,
    determine whether the one or more mesh portions of each of the two or more flue gas apparatus exceed a fouling threshold, and
    for each of the two or more flue gas apparatuses, based on the respective differential pressure and whether the one or more mesh portions of each of the two or more flue gas apparatus exceeds the fouling threshold, move one or more of the one or more mesh portions from one of (a) the first configuration to the second configuration or (b) the second configuration to the first configuration.

19. The system according to claim 18, wherein each of the two or more flue gas apparatuses further comprises a motor connected to the one or more mesh portions, wherein the controller is in signal communication with the motor, and wherein the controller moves the one or more mesh portions via a signal transmitted to the motor indicative of movement of one of the one or more mesh portions.

20. The system according to claim 18, wherein the optical sensor is further operable to optically inspect and monitor cleanliness of the one or more mesh portions for a corresponding one of the two or more flue gas apparatuses while the one or more mesh portions reside external to the corresponding one of the two or more flue gas apparatuses; and wherein the controller is further configured to, for each of the two or more flue gas apparatuses, based on the respective cleanliness of the one or more mesh portions, move the one or more mesh portions from the second configuration to the first configuration.

21. The system according to claim 18, wherein each of the two or more flue gas apparatuses comprises one or more sealing elements connected to the outer edge of the housing, the one or more sealing elements operable to sealingly engage the duct, thereby to prevent heated flue gas from escaping the duct when heated flue gas flows therethrough.

\* \* \* \* \*